United States Patent
Nishimura et al.

(10) Patent No.: US 8,479,308 B2
(45) Date of Patent: Jul. 2, 2013

(54) SCANNING PROBE MICROSCOPE AND METHOD FOR DETECTING PROXIMITY OF PROBES THEREOF

(75) Inventors: Katsuhito Nishimura, Atsugi (JP); Yoichi Kawakami, Kusatsu (JP); Mitsuru Funato, Kyoto (JP); Akio Kaneta, Yasu (JP); Tsuneaki Hashimoto, Ageo (JP)

(73) Assignee: Kyoto University, Kyoto (JP)

( * ) Notice: Subject to any disclaimer, the term of this patent is extended or adjusted under 35 U.S.C. 154(b) by 0 days.

(21) Appl. No.: 13/380,261

(22) PCT Filed: Jun. 21, 2010

(86) PCT No.: PCT/JP2010/060494
§ 371 (c)(1),
(2), (4) Date: Jan. 26, 2012

(87) PCT Pub. No.: WO2010/150756
PCT Pub. Date: Dec. 29, 2010

(65) Prior Publication Data
US 2012/0124706 A1 May 17, 2012

(30) Foreign Application Priority Data

Jun. 23, 2009 (JP) ................................. 2009-149205
Feb. 8, 2010 (JP) ................................. 2010-025975

(51) Int. Cl.
*G01Q 10/00* (2010.01)
(52) U.S. Cl.
USPC .......... 850/1; 850/5; 850/7; 850/33; 250/307; 73/504.12; 73/504.15

(58) Field of Classification Search
USPC .............. 850/1, 5, 7, 33; 250/307; 73/504.12, 73/504.15
See application file for complete search history.

(56) References Cited

U.S. PATENT DOCUMENTS

| | | | | |
|---|---|---|---|---|
| 5,214,389 | A | * | 5/1993 | Cao et al. ...................... 324/719 |
| 5,721,721 | A | * | 2/1998 | Yanagisawa et al. .......... 369/126 |
| 5,889,208 | A | * | 3/1999 | Nose .......................... 73/504.16 |
| 7,533,561 | B2 | * | 5/2009 | Beyder et al. .................... 73/105 |
| 2004/0025578 | A1 | | 2/2004 | Hare et al. |
| 2005/0242283 | A1 | * | 11/2005 | Hasegawa et al. ............ 250/310 |

FOREIGN PATENT DOCUMENTS

| | | |
|---|---|---|
| CN | 1666312 A | 9/2005 |
| JP | A-2002-031591 | 1/2002 |

(Continued)

OTHER PUBLICATIONS

Sigehuzi et al., "Dual-probe Scanning Near-field Optical Microscope," *Technical Report of IEICE*, OME Dec. 1996 (May 1996), pp. 13-18, (With English-language Abstract).

(Continued)

*Primary Examiner* — Michael Logie
(74) *Attorney, Agent, or Firm* — Oliff & Berridge, PLC

(57) ABSTRACT

A scanning probe microscope includes: a first and second probes for scanning a sample while maintaining the distance to the sample surface; crystal oscillators holding each of the first and second probes; and a modulation oscillator for providing the first probe with a vibration of a specific frequency which is different from the resonant frequency of each crystal oscillator. A control unit monitors the vibration of the specific frequency of the first and second probes, detects proximity of the first probe and the second probe to each other based on the change of the specific frequencies, and controls the drive of the first and second probes.

20 Claims, 23 Drawing Sheets

FOREIGN PATENT DOCUMENTS

| | | |
|---|---|---|
| JP | A-2005-532555 | 10/2005 |
| JP | A-2008-014903 | 1/2008 |
| JP | A-2008-298487 | 12/2008 |
| WO | WO 2004/006302 A2 | 1/2004 |

OTHER PUBLICATIONS

Micheletto et al., "Direct mapping of the far and near filed optical emission of nano-sized tapered glass fibers by an integrated SNOM/SF system," *Applied Surface Science*, vol. 144-145, pp. 514-519, Apr. 1999.

International Search Report issued in Application No. PCT/JP2010/060494; Dated Sep. 7, 2010 (With Translation).

International Preliminary Report on Patentability issued in Application No. PCT/JP2010/060494; Dated Jan. 17, 2012 (With Translation).

\* cited by examiner

FIRST PROBE   SECOND PROBE

SAMPLE

DETECTION OF THE PROXIMITY OF TWO PROBES

FIRST PROBE   SECOND PROBE

SAMPLE

INSUFFICIENT PROXIMITY

FIRST PROBE   SECOND PROBE

SAMPLE

COLLISION

FIRST PROBE

SECOND PROBE

SAMPLE

OVERRIDING

FIRST PROBE　　　　　　　　　　SECOND PROBE 1 um

SEM IMAGE OF PROBE TIPS

LOCUS OF THE FIRST PROBE TIP

SEM IMAGE OF PROBE TIPS

LOCUS OF THE FIRST PROBE TIP

FIRST PROBE     SECOND PROBE 1 um

SEM IMAGE OF TIPS

FIRST PROBE     SECOND PROBE

DETECTED MODULATED SIGNAL AT THE EDGE

SEM IMAGE OF TIPS

MODULATED SIGNAL MAPPING OF I PROBE AT THE EDGE AND THE PROFILE

FIRST PROBE    SECOND PROBE

SEM IMAGE OF TIPS    1 um

SECOND PROBE    FIRST PROBE

Broken Edge Area

DETECTION OF THE MODULATED SIGNAL
AT THE EDGE AND THE PROFILE

Estimated Excitation Point

Fig. 23A
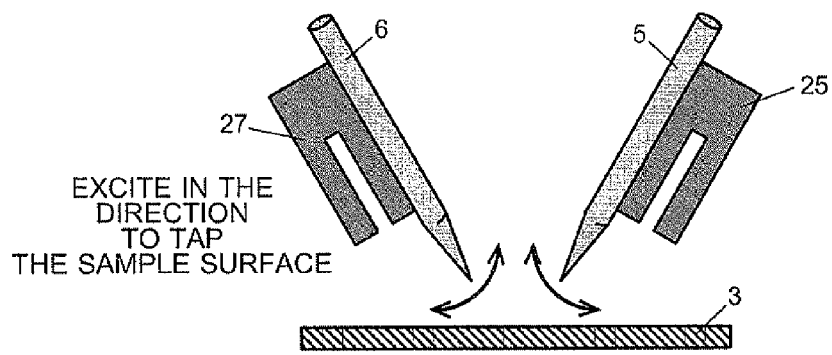
EXCITE IN THE
DIRECTION
TO TAP
THE SAMPLE SURFACE
TURN THE EXCITATION DIRECTION
BY 90 DEGREES
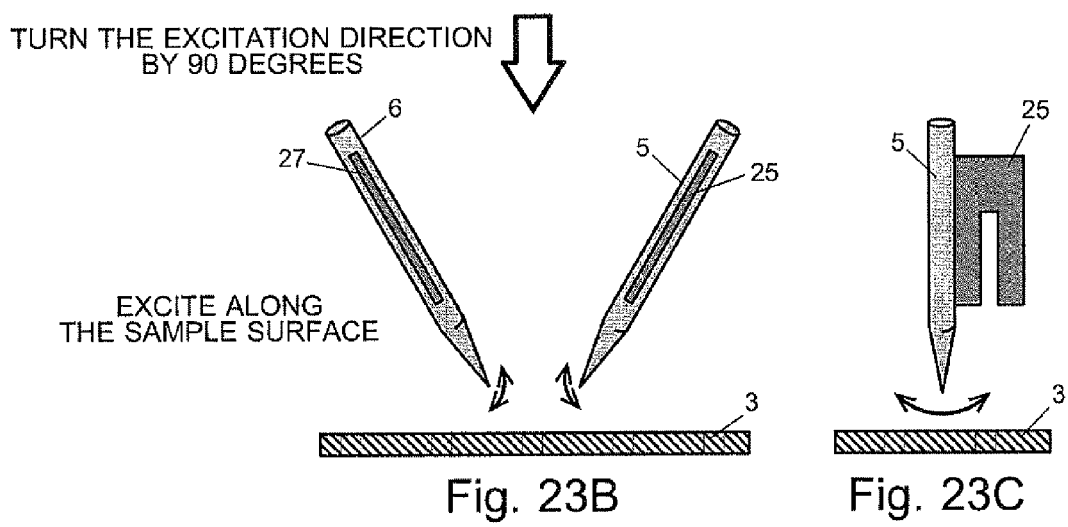
EXCITE ALONG
THE SAMPLE SURFACE
Fig. 23B       Fig. 23C

C PROBE

SCANNING PROBE MICROSCOPE AND METHOD FOR DETECTING PROXIMITY OF PROBES THEREOF

TECHNICAL FIELD

The present invention relates to a scanning probe microscope having a plurality of probes and a method for detecting the proximity of those probes. In particular, it relates to a scanning probe microscope for controlling the distance between the sample surface and the probe tip by a shear force method, and a method for detecting the proximity of its probes.

BACKGROUND ART

Scanning probe microscopy (SPM) is a technique for measuring in nanoscale the surface profile of a sample or a variety of physical properties and functions of the sample surface by scanning the sample surface with a sharp-pointed probe. In recent years, scanning probe microscopes having a plurality of probes have been developed with the aim of more accurately measuring the surface profile and a variety of physical properties and functions of a sample.

In such a scanning probe microscope having a plurality of probes, an optical microscope or an electron microscope is conventionally used to move the plurality of probes to the measurement position on the sample surface (refer to Patent Document 1).

In a scanning near-field optical microscope (SNOM), which is a kind of scanning probe microscope, a near-field light is generated around a probe positioned near a sample, and the light intensity or the optical characteristics of the scattered light generated by the interaction between the probe and the sample surface is measured to detect the surface condition of the sample. It is very important to accurately detect the distance between the sample surface and the probe tip and precisely control the position of the probe tip in order to realize a resolution beyond the diffraction limit of light.

BACKGROUND ART DOCUMENT

Patent Document

[Patent Document 1] JP-A 2008-14903

DISCLOSURE OF THE INVENTION

Problem to be Solved by the Invention

In an SNOM, the distance between the sample surface and the probe tip or that between probes is sometimes set to be smaller than the diffraction limit of light. In such a case, it is impossible to control the position of the probe tip by monitoring it using an optical microscope. Although an electron microscope may be used to observe the distance between the sample surface and the probe tip or that between probes, it is troublesome and time-consuming.

In an SNOM with a single probe, the distance between the probe tip and the sample surface is controlled by using an interaction (shear force) that occurs therebetween when the probe tip and the sample surface are close to each other. However, this control method cannot be used in an SNOM having a plurality of probes, because, when probes are in proximity to each other, there is an influence of the shear force between the probes, which prevents an individual control of the position of each probe.

The problem to be solved by the present invention is to provide a scanning probe microscope capable of accurately controlling the relative distance among a plurality of probes and a method for detecting the proximity of its probes.

Means for Solving the Problem

The present invention has been developed to solve the previously described problem, and the first aspect of the present invention provides a scanning probe microscope having a first probe and a second probe both for scanning a sample while maintaining a constant distance to a surface of the sample, including:

a) a first scanner for moving the first probe relative to the sample;
b) a second scanner for moving the second probe relative to the sample;
c) a vibrator for providing either the first probe or the second probe with a vibration of a specific frequency;
d) a vibration monitor for monitoring the vibration of the specific frequency of the first probe and the second probe;
e) a probe proximity detector for detecting proximity of the first probe and the second probe to each other based on a change of at least either a vibration of the first probe or a vibration of the second probe; and
f) a controller for controlling the first scanner and the second scanner based on a result of detection by the probe proximity detector.

The number of the first probe is not limited to one but may be plural. Similarly, the number of the second probe may be one or more than one.

In the first aspect of the present invention, the vibrator may provide the first probe with the vibration; and the probe proximity detector may detect proximity of the first probe and the second probe to each other based on the fact that a rate of change of the vibration of the first probe is equal to or less than a threshold. Alternatively, the probe proximity detector may detect proximity of the first probe and the second probe to each other based on the fact that a rate of change of the vibration of the second probe exceeds a threshold.

The second aspect of the present invention is a specific mode of the scanning probe microscope according to the first aspect of the present invention, wherein the first probe and the second probe are attached to a first tuning-fork oscillator and a second tuning-fork oscillator, and the scanners move each of the first probe and the second probe while resonating each of the tuning-fork oscillators, and the scanning probe microscope including:

a voltage detector for detecting a voltage signal induced in each of the tuning-fork oscillators when a tip of the first probe and a tip of the second probe are individually approximated to the surface of the sample; and a probe-sample distance controller for stabilizing a distance between the tip of each probe and the sample surface based on a result of detection by the voltage detector.

The third aspect of the present invention provides a scanning probe microscope having a first probe and a second probe both for scanning a sample while maintaining a constant distance to a surface of the sample, including:

a) a first tuning-fork oscillator to which the first probe is attached;
b) a second tuning-fork oscillator to which the second probe is attached;
c) a scanner for moving each of the first probe and the second probe relative to the sample while resonating each of the first tuning-fork oscillator and the second tuning-fork oscillator;

d) a vibrator for providing either the first probe or the second probe with a vibration of a specific frequency;

e) a signal detector for detecting a voltage signal of the specific frequency induced in each of the tuning-fork oscillators when the first probe and the second probe are approximated to each other while each of the first tuning-fork oscillator and the second tuning-fork oscillator is resonated; and f) a probe proximity detector for detecting proximity of the first probe and the second probe to each other based on a voltage signal of the specific frequency induced in each of the first tuning-fork oscillator and the second tuning-fork oscillator.

In the third aspect of the present invention, the probe proximity detector may preferably detect proximity of the first probe and the second probe to each other based on the product of a voltage signal of the specific frequency induced in the first tuning-fork oscillator and a voltage signal of the specific frequency induced in the second tuning-fork oscillator.

Alternatively, in the third aspect of the present invention, the probe proximity detector may detect proximity of the first probe and the second probe to each other based on the sum of a voltage signal of the specific frequency induced in the first tuning-fork oscillator and a voltage signal of the specific frequency induced in the second tuning-fork oscillator.

In the second and third aspects of the present invention, the specific frequency may preferably be different from the resonance frequency of the tuning-fork oscillators.

The fourth aspect of the present invention provides a method for detecting proximity of probes of a scanning probe microscope having a first probe and a second probe both for scanning a sample while maintaining a constant distance to a surface of the sample, comprising the steps of:

providing either the first probe or the second probe with a vibration of a specific frequency; and detecting proximity of the first probe and the second probe to each other by detecting the vibration of the specific frequency which is transmitted from the first probe to the second probe.

In particular, it is preferable that the proximity of the first probe and the second probe to each other is detected based on a change of at least either a vibration of the specific frequency of the first probe or a vibration of the specific frequency of the second probe.

The fifth aspect of the present invention provides a method for detecting proximity of probes of a scanning probe microscope having a first probe and a second probe both for scanning a sample while maintaining a constant distance to a surface of the sample, wherein:

the first probe is attached to a first tuning-fork oscillator;

the second probe is attached to a second tuning-fork oscillator;

a vibration of a specific frequency is provided to either the first probe or the second probe; and proximity of the first probe and the second probe to each other is detected based on a voltage signal of the specific frequency induced in each of the first tuning-fork oscillator and the second tuning-fork oscillator.

Effect of the Invention

In scanning the surface of a sample with a plurality of probes, when the plurality of probes are moved closer to each other, an interaction called the "shear force" occurs between the probes. This interaction affects the vibration state of each probe. In the scanning probe microscope of the present invention, while the first and second probes are being moved, a vibration of a specific frequency is provided to one of these probes, and the vibration of the specific frequency is monitored for both probes. The proximity of these probes is detected based on a change of the vibration of the specific frequency in at least one of these probes. Therefore, it is possible to prevent a collision of the first and second probes while these probes are being moved.

BRIEF DESCRIPTION OF THE DRAWINGS

FIG. 6A illustrates the relationship between the X-axis coordinate position (x) of the first probe and the Z-axis coordinate position (z) of the first and second probes; FIG. 6B illustrates the relationship between the X-axis coordinate position (x) of the first probe and the amplitude of the resonant vibration of the first and second probes; and FIG. 6C illustrates the relationship between the X-axis coordinate position (x) of the first probe and the amplitude of the modulated vibration of the first and second probes.

FIG. 9A illustrates a scanning electron microscope (SEM) image of the tips of the probes; and FIG. 9B illustrates a locus of the first probe.

FIG. 11A shows an SEM image of each of the tips of the probes; and FIG. 11B shows a modulated signal map of each of the tips of the probes.

FIG. 12A shows an SEM image of each of the tips of the probes; and FIG. 12B shows a modulated signal map of the first probe.

FIGS. 23A, 23B, and 23C are diagrams for explaining the arrangement of the crystal oscillators with respect to the probes in the second embodiment of the present invention: FIG. 23A illustrates the arrangement of the crystal oscillators of the first embodiment; and FIGS. 23B and 23C each illustrate the arrangement of the crystal oscillators of the second embodiment.

FIG. 25 shows the case where the two probes were away from each other; and FIG. 26B shows the case where the two probes were in proximity to each other.

BEST MODES FOR CARRYING OUT THE INVENTION

Hereinafter, concrete embodiments of the present invention will be described with reference to the figures.

Figure 1:
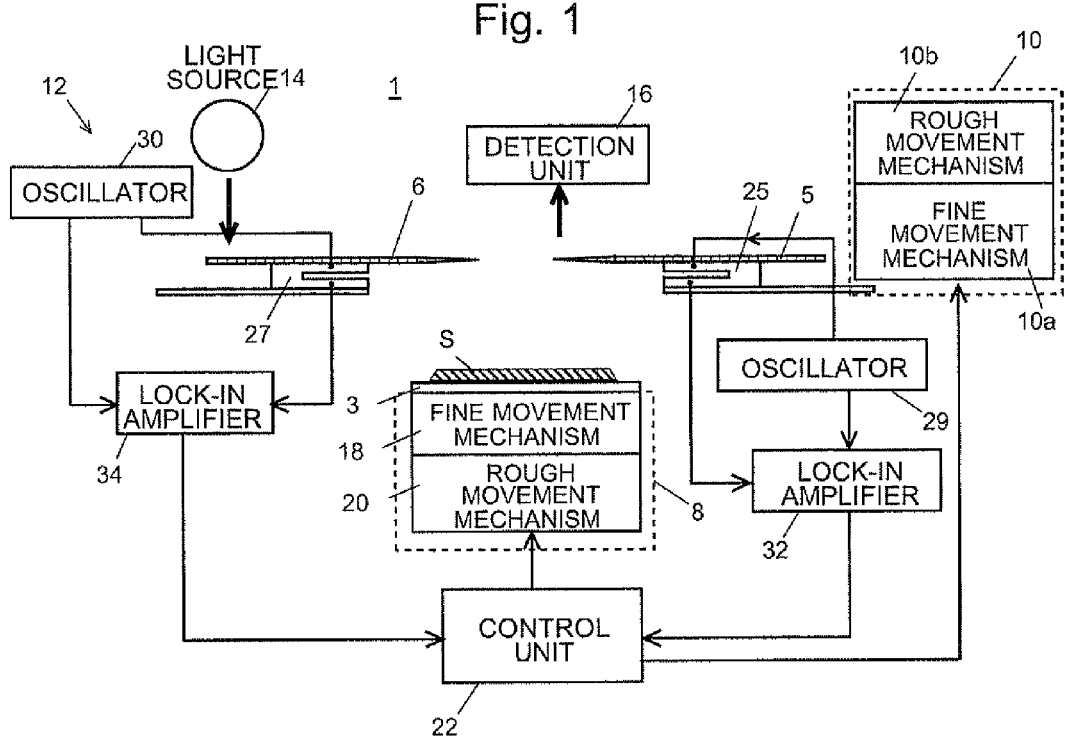
FIG. 1 is a schematic configuration diagram of a scanning near-field optical microscope according to the first embodiment of the present invention.

Initially, the first embodiment of the present invention will be described with reference to FIGS. 1 through 22. The scanning probe microscope (SPM) according to the present embodiment is a near-field optical microscope (SNOM). FIG. 1 shows a schematic configuration diagram of the scanning near-field optical microscope according to the present embodiment. As shown in FIG. 1, the SNOM 1 of the first embodiment includes: a sample stage 3 on which a sample S is placed; a first probe 5 and a second probe 6 for scanning the surface of the sample S; a sample movement mechanism 8 for moving the sample stage 3 in the XY (horizontal) direction and in the Z (vertical) direction; a probe movement mechanism 10 for moving the first probe 5 in the XY (horizontal) direction and in the Z (vertical) direction; a distance control mechanism 12 for controlling the distance of the tips of the first probe 5 and the second probe 6 from the sample; a light source 14 for generating a laser light; and a detection unit 16 for detecting a signal light emitted from the sample. The detection unit 16 includes a condensing lens, a spectroscope, and a charge-coupled device (CCD).

The sample movement mechanism 8 is composed of a fine movement mechanism 18 driven with a piezo-actuator, and a rough movement mechanism 20 driven with a stepping motor. The sample movement mechanism 8 moves the sample stage 3 in the horizontal (XY) direction and in the vertical (Z) direction. The control unit 22 controls the sample movement mechanism 8 so as to selectively perform a relatively large movement with the rough movement mechanism 20 and a micro movement with the fine movement mechanism 18. By this mechanism, the sample placed on the sample stage 3 can be moved in the horizontal direction and in the vertical direction.

Both the first probe 5 and the second probe 6 are composed of an optical fiber probe having a sharp-pointed tip at which a micro opening with a diameter equal to or less than the wavelength to be taken out as a near-field light is formed. Each of the optical fiber probes is metal-coated (e.g. gold (Au) coated) except for their tips and openings.

The laser light emitted from the light source 14 is introduced into either the first probe 5 or the second probe 6 from an end thereof, and leaks out from the micro opening of the probe tip to form a near-field light on the sample surface. Meanwhile, the scattered light and other types of light generated on the sample surface by the near-field light formed on the sample surface are introduced into either the tip opening of the first probe 5 or that of the second probe 6, to be sent to the detection unit 16. The probe for guiding light from the light source 14 to the sample surface is called an illumination probe (I probe), and the probe for collecting lights generated on the sample surface and guiding them to the detection unit 16 is called a collection probe (C probe). In the SNOM 1 of the present embodiment, both the first probe 5 and the second probe 6 can be used as either the I probe or C probe.

The probe movement mechanism 10 is composed of a fine movement mechanism 10a driven with a piezo-actuator and a rough movement mechanism 10b driven with a stepping motor. The probe movement mechanism 10 moves the first probe 5 in the horizontal (XY) direction and in the vertical (Z) direction. The fine movement mechanism 10a and the rough movement mechanism 10b are connected to the control unit 22. The control unit 22 selectively performs a relatively large movement with the rough movement mechanism 10b and a micro movement with the fine movement mechanism 10a. In the present embodiment, the sample movement mechanism 8 and the probe movement mechanism 10 function as the first scanner, and the sample movement mechanism 8 functions as the second scanner.

The distance control mechanism 12 controls the distance between the tip of the first probe 5 and the sample surface as well as the distance between the tip of the second probe 6 and the sample surface by detecting the shear force acting between the sample surface and each of the tips of the first and second probes 5 and 6 while the first probe 5 and the second probe 6 being micro-vibrated are moved closer to the sample surface. In particular, the distance control mechanism 12 is composed of: tuning-fork (U-shaped) crystal oscillators 25 and 27; oscillators 29 and 30 respectively connected to the crystal oscillators 25 and 27; and lock-in amplifiers 32 and 34. Each of the crystal oscillators 25 and 27 has a U-shaped structure in which a pair of oscillating bodies is connected to each other. The pair of the oscillating bodies is electrically insulated. The oscillator 29 is electrically connected to one oscillating body of the crystal oscillator 25, and the oscillator 30 is electrically connected to one oscillating body of the crystal oscillator 27.

In FIG. 1, the probes (the first probe 5 and the second probe 6) are fixed to the oscillating bodies to which the oscillators (the oscillator 29 and the oscillator 30) are respectively connected. However, the probes (the first probe 5 and the second probe 6) may be fixed to the oscillating bodies to which the lock-in amplifiers (the lock-in amplifier 32 and the lock-in amplifier 34) are connected.

A reference signal for performing a phase detection (synchronous detection) is provided from the oscillators 29 and 30 to the lock-in amplifiers 32 and 34.

When a voltage for vibration (alternating voltage) is applied from the oscillators 29 and 30 to the oscillating bodies, the oscillating bodies vibrate in the plane where the U-shaped structure of the tuning fork exists. In synchronization with this, the other oscillating body vibrates. With the frequency of the resonance point, they resonate with the greatest amplitude. At this point, the voltage induced in each of the oscillating bodies is measured in the lock-in amplifiers 32 and 34, and provided to the control unit 22.

In this state, the tips of the probes 5 and 6 are moved closer to the sample surface. When the distance between the tips of the probes 5 and 6 and the sample surface is not greater than a certain value, a shear force acts on the probes 5 and 6 and decreases the amplitude of their vibration, which decreases the amplitude of the oscillating bodies as well. As the amplitude of the oscillating bodies decreases, the amplitude of the voltage measured in the lock-in amplifiers 32 and 34 also decreases. The control unit 22 controls the probe movement mechanism 10 so as to maintain a constant amplitude of the voltage measured by the lock-in amplifier 32, and also controls the sample movement mechanism 8 so as to maintain a constant amplitude of the voltage measured by the lock-in amplifier 34. Thus, the present system can move the probes 5 and 6 while maintaining a constant distance between the tip of the probe 5 and the sample surface as well as between the tip of the probe 6 and the sample surface.

In the SNOM 1 of the present embodiment, the sample surface can be observed by using both the first probe 5 and the second probe 6, or by using only one of them. A mode for observing the sample surface by using either one of the first probe 5 and the second probe 6 as the I probe and the other probe as the C probe is called a dual IC mode. A mode for observing the sample surface by using only one of the first probe 5 and the second probe 6 is called an IC mode, I mode, or C mode. In the IC mode, one probe serves as the IC probe which serves as both the I probe and C probe; the probe for supplying a laser light from the light source 14 to the sample surface also serves as a guide for collecting the scattered light generated on the sample surface and sending it to the detection unit 16. In the C mode, either the first probe 5 or the second probe 6 serves as the C probe; the sample surface is irradiated with a light from a far field, and the scattered light or other types of light generated on the sample surface by the light is collected with the C probe. In the I mode, either the first probe 5 or the second probe 6 serves as the I probe; the sample surface is irradiated with a light by using the I probe, and the scattered light or other types of light generated by the light is broadly observed with a lens or other means.

For example, in the case where the sample S is a semiconductor, it can be observed in the previously described four modes as follows: In the C mode, the semiconductor is broadly irradiated with a light from a far field to excite carriers, and a local luminescence resulting from the recombination of the carriers is collected with the C probe to be observed. In the I mode, the semiconductor is locally irradiated with a light, and a luminescence from the excited carriers is broadly observed with a lens. In the IC mode or dual IC mode, the semiconductor is locally exited with the I probe or IC probe, and a locally collected light of the luminescence resulting from the recombination of the exited carriers can be observed with the C probe or IC probe.

In particular, in the dual IC mode, by moving the I probe and the C probe closer to each other, the luminescence from the carriers excited by the light from the I probe can be captured with the C probe. This allows an observation of the flow direction of the carriers, i.e. the carrier flow path. The carrier diffusion length in InGaN, which is a kind of semiconductor, is estimated to be about several hundreds of nm. In order to observe a carrier flow path of InGaN, the distance between the first and the second probes 5 and 6 has to be less than several hundreds of nm.

As just described, in the IC mode, I mode, and C mode, the sample surface is scanned with one probe. In the dual IC mode, the sample surface is scanned with two probes, and therefore it is necessary to control the distance between the probes as well as the distance between both probes and the sample. In particular, when the two probes 5 and 6 are moved closer to each other, it is necessary to control their movement so that they will not collide with each other. However, when the distance between the probes 5 and 6 is not more than a certain value, a shear force acts between the probes 5 and 6. Hence, it is necessary to take the influence of the shear force into consideration in controlling the movement of the probes 5 and 6.

Given this factor, in the SNOM 1 of the present embodiment, in performing a measurement in the dual IC mode, either the first probe 5 or the second probe 6, e.g. the first probe 5, is supplied with a vibration of a specific frequency (which will hereinafter be called a "modulated vibration") which is different from the resonant frequency of the crystal oscillator 25. Then, the amplitude of the modulated vibration is detected for both the probes 5 and 6, and based on a change of the amplitude, it is determined that the two probes 5 and 6 are in proximity to each other.

Figure 2:
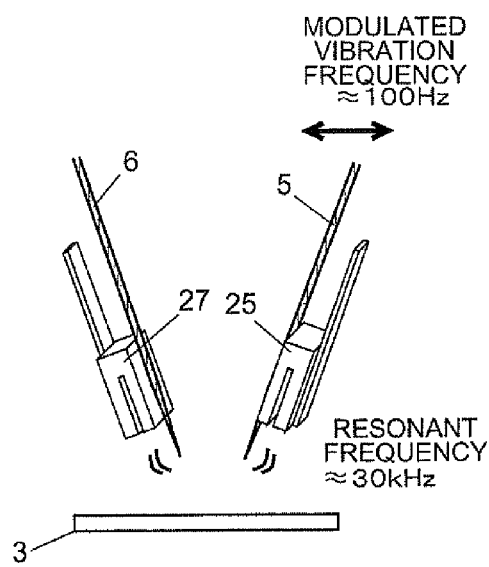
FIG. 2 is a diagram for explaining the vibration provided to the first and the second probes.
Figure 3:
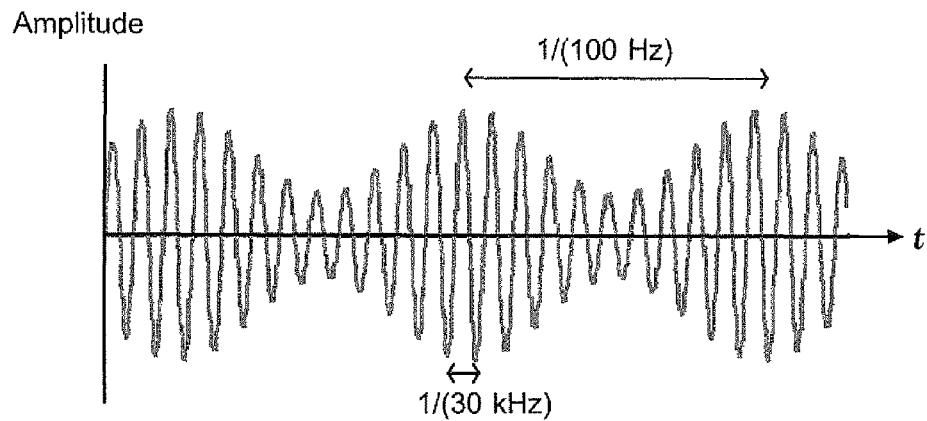
FIG. 3 shows the waveform of the vibration provided to the first probe.

FIG. 2 shows a vibration provided to each of the probes. In particular, under the control of the control unit 22, the fine movement mechanism 10a is driven so as to physically vibrate the crystal oscillator 25 at a specific frequency (100 Hz) which is far from the vicinity of the resonant frequency of 30 kHz. That is, in the present embodiment, the control unit 22 has the function of controlling the movement of each probe as well as the function of oscillating one probe (crystal oscillator) at the specific frequency (100 Hz). As a consequence, the first probe 5 vibrates at 30 kHz which is the resonant frequency of the crystal oscillator 25, and simultaneously it vibrates at 100 Hz in the direction parallel to the sample surface (horizontal direction). FIG. 3 shows a waveform of the vibration provided to the first probe 5. In this manner, in the SNOM 1 of the present embodiment, the first and second probes 5 and 6 are made to vibrate at the resonant frequency, and the distance between the first probe 5 and the sample, the distance between the second probe 6 and the sample, and the distance (interprobe distance) between the first probe 5 and the second probe 6 are controlled by providing the first probe 5 with a modulation by a physical vibration. Such a control method will be hereinbelow called a dualband modulation control method.

Figure 4:
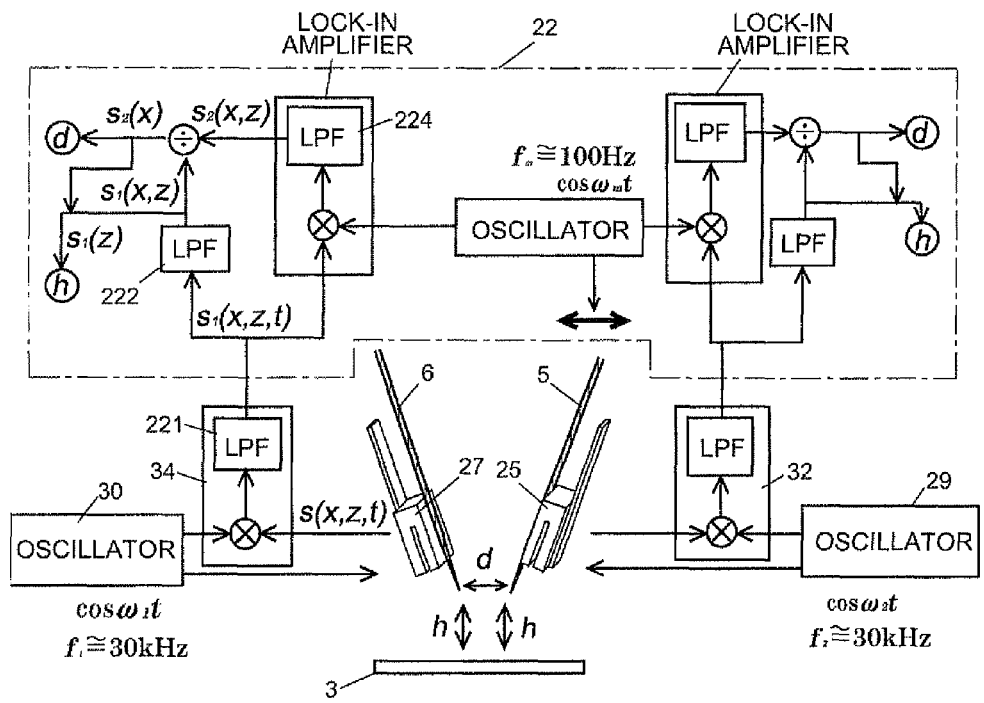
FIG. 4 is a diagram showing the processing flow of the piezoelectric signal generated by the vibration of a crystal oscillator of each probe in a dualband modulation control method.

FIG. 4 is a diagram showing the processing flow of the dualband modulation control method. In FIG. 4, the oscillator 22 oscillates at the specific frequency (100 Hz). However, actually, it is the control unit 22 that has the function of generating the oscillation at the specific frequency as previously described.

Hereinafter, the processing flow of the dualband modulation control method will be described in detail.

For example, consider the case where the two objects of the probe B and the sample (surface) exist in the vicinity of the probe A. Let x and z be the distance from the probe A to the probe B and that to the sample, respectively. When C is the amplitude of the crystal oscillator (tuning fork), the actual oscillation can be expressed by $$C \cos \omega_1 t.$$

In this case, suppose that the relationship between C, x and z is expressed by $$C = fx(x) fz(z).$$

Function $fx(x)$ is represents the relationship regarding the magnitude of the amplitude attenuation that the probe B gives to probe A, and function $fz(z)$ represents the relationship regarding the magnitude of the amplitude attenuation that the sample surface gives to probe A. Both $fx(x)$ and $fz(z)$ are a monotonically decreasing function, and the differential functions $fx(x)$ and $fz(z)$ also monotonically decrease in the area where the distance between the probes A and B and the distance between the sample surface and the probe A are large to some extent. When the distance x is modulated with a frequency of $\omega_m/2\pi$ and an amplitude of $\alpha$, given that the amplitude $\alpha$ is sufficiently small, $fx(x)$ can be expressed by the following approximation formula:

$$fx(x) = fx(x0) + af'x(x0) \cos \omega_m t.$$

Hence, for example, the piezoelectric signal $s(x, z, t)(=kC \cos \omega_1 t)$ of the tuning fork generated by the vibration of the crystal oscillator 27 will be:

$$s(x,z,t) = kfz(z)(fx(x0) + af'x(x0)\cos \omega_m t)\cos \omega_1 t,$$

in which the modulated vibration and the resonant vibration are superimposed, where k is a proportional (physical) constant representing the relationship between the amplitude C of the crystal oscillator and the signal $s(x, z, t)$.

The piezoelectric signal $s(x, z, t)$ multiplied by $\cos\omega_1 t$ of the reference signal which is in synchronization with the resonant vibration gives the following:

$$s(x, z, t)\cos\omega_1 t = kfz(z)(fx(x0) + af'x(x0)\cos\omega_m t)\cos^2 \omega_1 t$$

$$= kfz(z)(fx(x0) + af'x(x0)\cos\omega_m t)[(1 + \cos 2\omega_1 t)/2]$$

$$= (1/2)kfz(z)(fx(x0) + af'x(x0)\cos\omega_m t) +$$

$$(1/2)kfz(z)(fx(x0) + af'x(x0)\cos\omega_m t)\cos 2\omega_1 t.$$

Passing this signal through a low-pass filter (LPF) 221 gives the resonant oscillation of only the frequency component which is the same as the resonant oscillation of the first term having an amplitude $s_1(x, z, t)$.

That is, $$s_1(x,z,t) = (1/2)kfz(z)(fx(x0) + af'x(x0)\cos\omega_m t).$$

This signal $s_1(x, z, t)$ additionally contains a modulated signal component $\cos \omega_m t$. This modulated signal component can be removed by passing the above signal through another LPF 222.

That is, $s_1(x, z) = (1/2)k\, fz(z)(fx(x0)$. is obtained.

This gives information $s_1(x, z)$ regarding the distance h between the second probe 6 and the sample surface and the distance d between the second probe 6 and the first probe 5.

Meanwhile, $s_1(x, z, t)$ multiplied by the modulated signal component $\cos\omega_m t$ gives the following:

$$s_1(x, z, t)\cos\omega_m t = (1/2)kfz(z)(fx(x0) + af'x(x0)\cos\omega_m t)\cos\omega_m t$$

$$= (1/2)kfz(z)(fx(x0)\cos\omega_m t +$$

$$(1/2)kfz(z)af'x(x0)\cos^2 \omega t)$$

$$= (1/2)kfz(z)(fx(x0)\cos\omega_m t +$$

$$(1/2)kfz(z)af'x(x0)[(1 + \cos 2\omega_m t)/2]$$

$$= (1/2)kfz(z)(fx(x0)\cos\omega_m t + (1/4)kfz(z)af'x(x0) +$$

$$(1/4)kfz(z)af'x(x0)\cos 2\omega_m t.$$

Passing this signal through a LPF 224 gives only the frequency component which is the same as the modulated signal of the second term (the amplitude $s_2(x, z)$ of the modulated vibration).

That is, $$s_2(x,z) = (1/4)kfz(z)af'x(x0)$$

is obtained

This signal $s_2(x, z)$ also includes the information on the distance h between the second probe 6 and the sample surface and the distance d between the second probe 6 and the first probe 5. The signal $s_2(x,z)$ divided by $s_1(x, z)$ gives the information $s_2(x)$ on the distance between the second probe 6 and the first probe.

That is, $$s_2(x) = (1/2)a[f'x(x0)/fx(x0)]$$

is obtained.

Reflecting the obtained signal $s_2(x)$ to $s_1(x, z)$ gives the information $s_1(z)$ on the distance h between the second probe 6 and the sample surface.

The previous explanation has been made for the piezoelectric signal generated by the vibration of the crystal oscillator 27 which is attached to the second probe 6. It is the same for the piezoelectric signal generated by the vibration of the crystal oscillator 25 which is attached to the first probe 5.

Based on the information on the distance h between the probe and the sample surface and the information on the distance d between the probes, the control unit 22 detects proximity of the first probe 5 and the second probe 6 to each other, and controls the sample movement mechanism 8 and the probe movement mechanism 10. Hence, in the present embodiment, the lock-in amplifiers 32 and 34 and the control unit 22 serve as the vibration monitor. The control unit 22 serves as the vibrator, the probe proximity detector, and the controller.

Figure 5A:
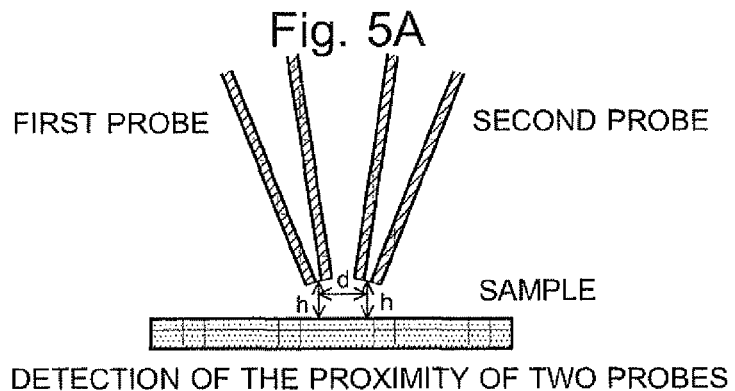
FIG. 5A is a conceptual diagram of a control of the first and the second probes.
Figure 5B:
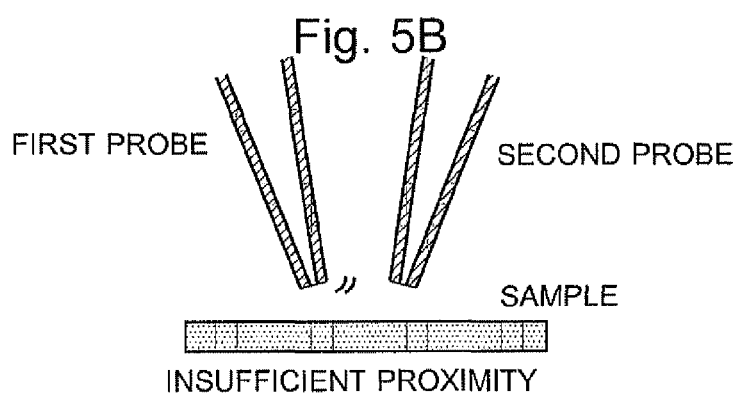
FIGS. 5B, 5C, and 5D show a phenomenon which is expected to occur when the control of the first and the second probes is not properly performed.
Figure 5C:
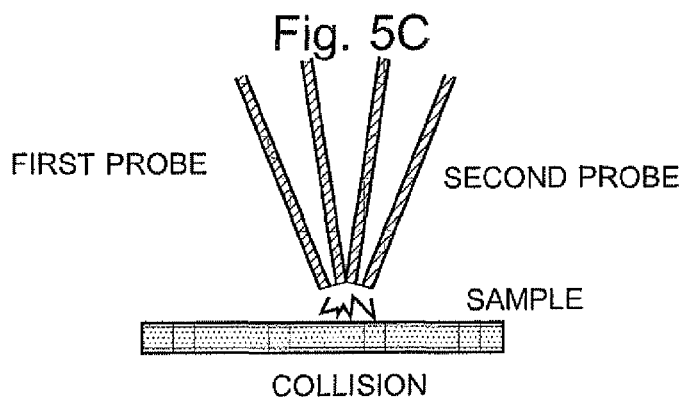
Figure 5D:
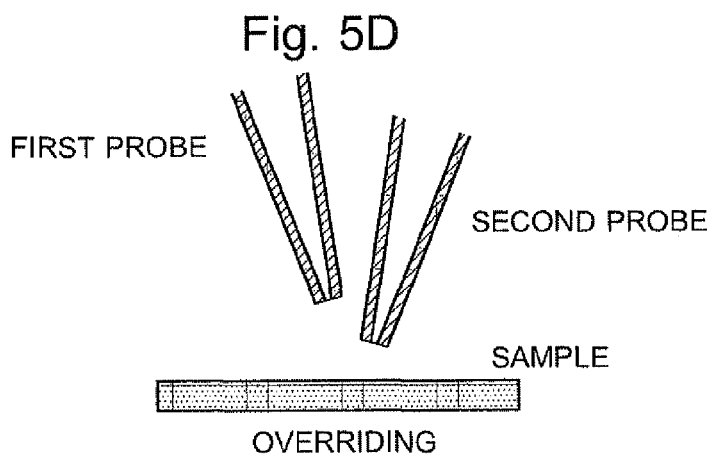

Some experiments were performed to test the control of the first probe 5 and second probe 6 in the dualband modulation control method. The test was mainly performed to know whether it was possible to detect the approximation of the two probes. Also, it was examined whether it was possible to detect the phenomena which might happen when the approximation detection was not performed as expected (such as "insufficient proximity", "collision", and "overriding of one probe onto the other probe"). FIG. 5A is a conceptual diagram of a distance control between the first and the second probes. FIGS. 5B, 5C, and 5D show possible phenomena which are expected to occur when the distance control between the first and the second probes is not performed as expected. Hereinafter, the results are described.

Figure 6A:
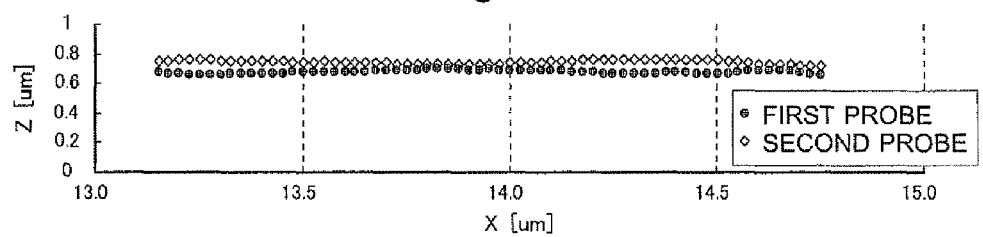
FIGS. 6A, 6B, and 6C show a validation result of the dualband modulation control method when the first probe is moved closer to the second probe.
Figure 6B:
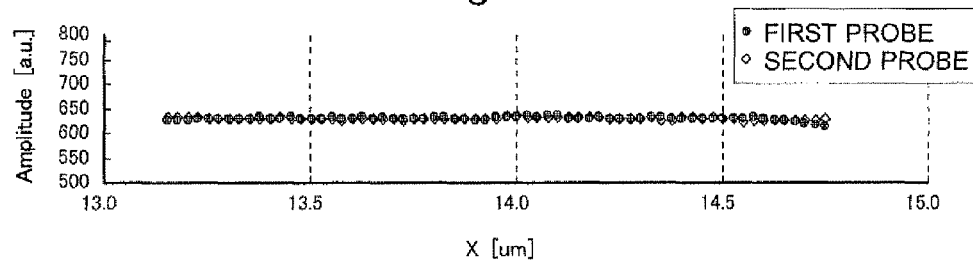
Figure 6C:
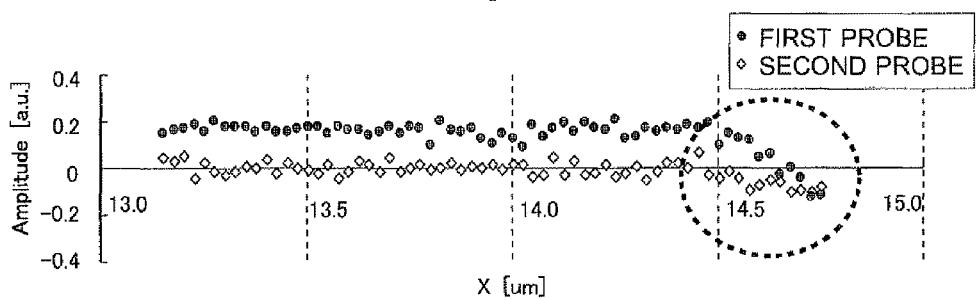
Figure 7A:
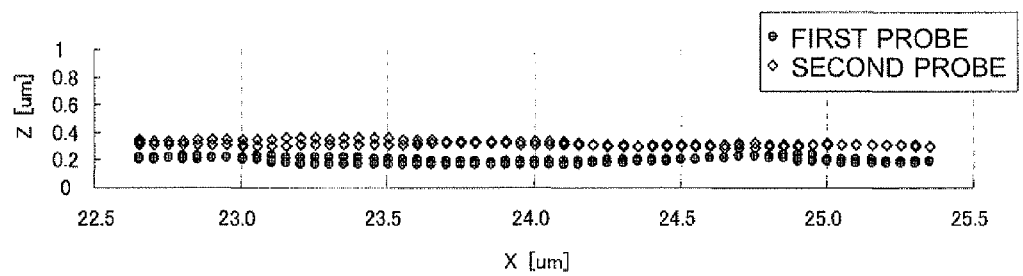
FIGS. 7A, 7B, and 7C show another validation result respectively corresponding to FIGS. 6A, 6B, and 6C.
Figure 7B:
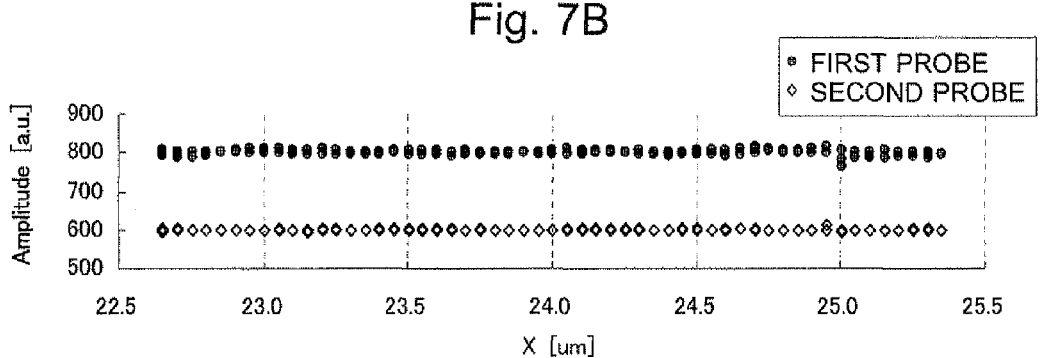
Figure 7C:
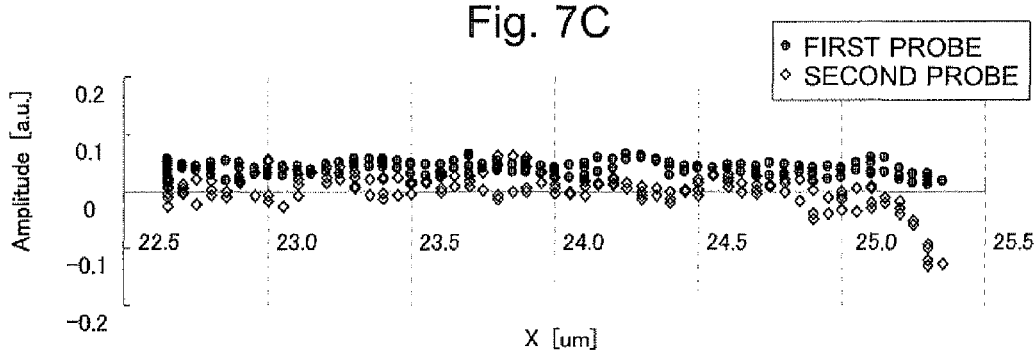

Initially, the first probe 5 was moved closer to the second probe 6, and the change of the vibration of the two probes (the first probe 5 and the second probe 6) was examined. The result is shown in FIGS. 6A through 6C and FIGS. 7A through 7C, which illustrate the test result of the dualband modulation control method. It should be noted that FIGS. 7A through 7C show the result of a test different from the test whose result is shown in FIGS. 6A through 6C. FIGS. 6A and 7A show the relationship between the X-axis coordinate position (x) of the first probe 5 and the Z-axis coordinate position (z) of each probe, when the first probe 5 was moved closer to the second probe 6. FIGS. 6B and 7B show the relationship between the X-axis coordinate position (x) of the first probe 5 and the amplitude of the resonant vibration of each of the probes 5 and 6. FIGS. 6C and 7C show the relationship between the X-axis coordinate position (x) and the amplitude of the modulated vibration of each of the probes 5 and 6. In these results, the initial position (an arbitrary position with respect to the sample surface) of the tip of the first probe 5 was considered to be the origin, and the direction from the origin to the second probe 6 was considered to be the positive direction (+). Hence, the larger the X-axis coordinate is, the closer the first probe 5 is to the second probe 6.

All the horizontal axes in FIGS. 6A through 6C and FIGS. 7A through 7C represent the X-axis coordinate of the first probe 5. The vertical axis of the FIGS. 6A and 7A represents the distance (z) from the sample stage 3 to each of the probes 5 and 6. The vertical axis of FIGS. 6B and 7B represents the amplitude of a vibration obtained by subtracting the modulated vibration from the vibration of the crystal oscillators 25 and 27. The vertical axis of FIGS. 6C and 7C represents the amplitude of the modulated signal of the first and second probes 5 and 6.

An explanation will be made with reference to FIGS. 6A through 6C. As shown in FIG. 6A, the distance between the first probe 5 and the sample stage 3 and the distance between the second probe 6 and the sample stage 3 were almost the same and constant in both cases where the first probe 5 and the second probe 6 were apart from each other and where they were in proximity to each other. As shown in FIG. 6B, the value obtained by subtracting the modulated vibration from the vibration of the crystal oscillator 25 of the first probe 5 and the value obtained by subtracting the modulated vibration from the vibration of the crystal oscillator 27 of the second probe 6, i.e. the amplitudes of the resonant vibrations, were almost constant.

On the other hand, as shown in FIG. 6C, when the first probe 5 and the second probe 6 were apart from each other, the modulated signal was detected only from the first probe 5. This signal was no longer detected after the modulation was halted. This fact suggests that the thereby detected signal was directly coming from the first probe 5.

When the first probe 5 was moved closer to the second probe 6, the modulated signal was detected from both the first and second probes 5 and 6 (the area surrounded with a dashed circle in FIG. 6C). This fact suggests that the proximity of the first and second probes 5 and 6 to each other caused propagation of the modulated signal from the first probe 5 to the second probe 6. As the modulated signal was detected from the second probe 6, the modulated signal detected from the first probe 5 attenuated. The most probable reason for this attenuation of the modulated signal of the first probe 5 is that, as the first and second probes 5 and 6 were in proximity to each other, the first probe 5 was also affected by the second probe 6 due to the interaction of the first probe 5 and the second probe 6.

As previously described, even when the first probe 5 and the second probe 6 were in proximity to each other, the distances (z) from the probes 5 and 6 to the sample stage 3 were almost the same and constant (FIG. 6A). Also, the amplitude of the resonant vibration of the crystal oscillator 25 of the first probe 5 and that of the crystal oscillator 27 of the second probe 6 were almost constant (FIG. 6B). These results show that, even when the two probes 5 and 6 were in proximity to each other and the modulated signal of the first probe 5 was propagated to the second probe 6, one probe did not climb up onto the other probe. It is likely that the collision of the probes 5 and 6 was avoided at least in the early stage of the period when the modulated signal was detected from the second probe 6. This is because, if the probes 5 and 6 collided with each other, the amplitude of the resonant vibration of the crystal oscillator would probably attenuate significantly.

In the test result of FIGS. 7A through 7C, when the first probe 5 was moved closer to the second probe 6, the Z-axis coordinate (z) of the probes 5 and 6 and the amplitude of the resonant vibration of the crystal oscillators were almost the same as the result of FIGS. 6A and 6B (refer to FIGS. 7A and 7B). On the other hand, as shown in FIG. 7C, the attenuation of the modulated signal of the first probe 5 was not observed even though the modulated signal of the second probe 6 was detected, showing a different pattern from the result shown in FIG. 6C.

The results shown in FIGS. 6A through 6C and FIGS. 7A through 7C suggest that, when the first and second probes 5 and 6 are in proximity to each other, it is possible to detect their proximity based on either or both of the following: (1) attenuation of the modulated signal of the first probe 5, and (2) detection of the modulated signal thorough the second probe 6. In this case, for example, the proximity of the first and second probes 5 and 6 may be detected based on the fact that the change of the modulated signal of either one of the first and second probes 5 and 6 exceeds a predetermined threshold.

Figure 8:
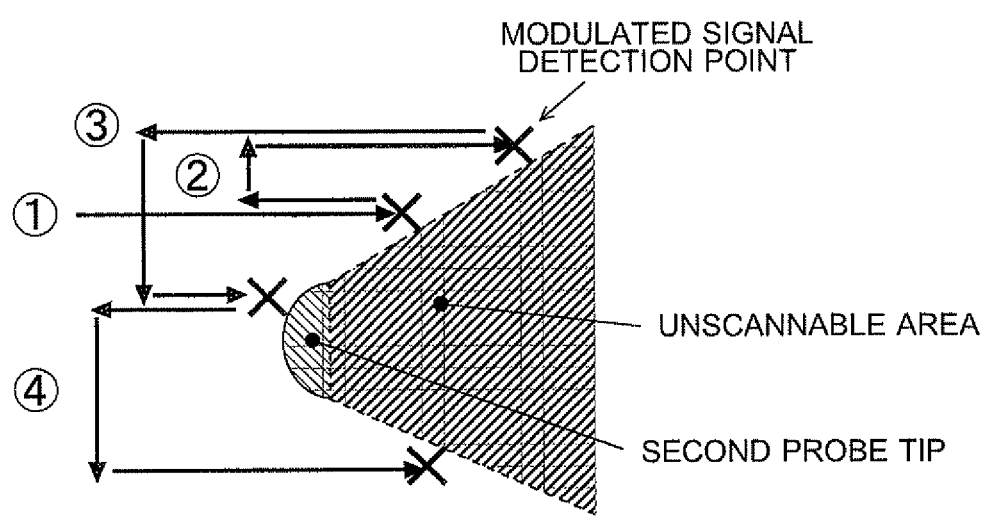
FIG. 8 shows a locus described by the first probe when an area near the tip of the second probe was scanned by the first probe while avoiding a collision of the tip of the second probe.

Then, it was verified whether it was possible to scan, with the first probe 5, an area near the tip of the second probe 6 while avoiding a collision with the tip of the second probe 6. First, in this verification experiment, the first and second probes 5 and 6 were visually aligned in the Y-direction by using an optical microscope. FIG. 8 shows a locus of the first probe when an area near the tip of the second probe 6 was scanned with the first probe 5 while avoiding a collision of the probes. In FIG. 8, the horizontal direction is referred to as the X-direction and the vertical direction as the Y-direction. In FIG. 8, the circled numbers show the movement order of the first probe 5. As shown in FIG. 8, the following processes were repeated: moving the first probe 5 in the X-direction toward the second probe 6 (approach), turning it back when the change of the modulated signal was detected, and moving it for about 500 nm in the Y-direction and then performing another approach to the second probe 6.

In this example, a decrease in the voltage value of the modulated signal of the first probe 5 to a level within a range of 80 through 90% was considered as the change of the modulated signal. The lower limit of the decrease of the voltage value was set at 80% in order to avoid the collision of the first probe 5 and the second probe 6 as much as possible. A greater amount of attenuation of the modulated signal means a stronger influence of the shear force and hence a smaller distance between the two probes. However, it also means that the probes are more likely to come into contact or collide with each other. The probes used in this embodiment were gold coated, and the gold coating is easily removed due to a contact. If the gold coating is removed, the probe must be replaced. Given this factor, in order to lower the possibility of the contact, the lower limit of the decrease of voltage value was set at 80%. However, if the probes used are relatively resistant to damage due to the contact, or if a small amount of detachment of the coating from the probes does not affect the measurements, then the lower limit may be set to be approximately 70%.

The upper limit of the modulated signal was set at 90% in order to eliminate the influence of noise. Although an attenuation of the modulated signal indicates that a shear force began to act between the two probes, the modulated signal can attenuate by a noise even without an action of the shear force. Therefore, if the influence of a noise can be eliminated, the upper limit of the modulated signal can be set to be approximately 95%

Figure 9A:
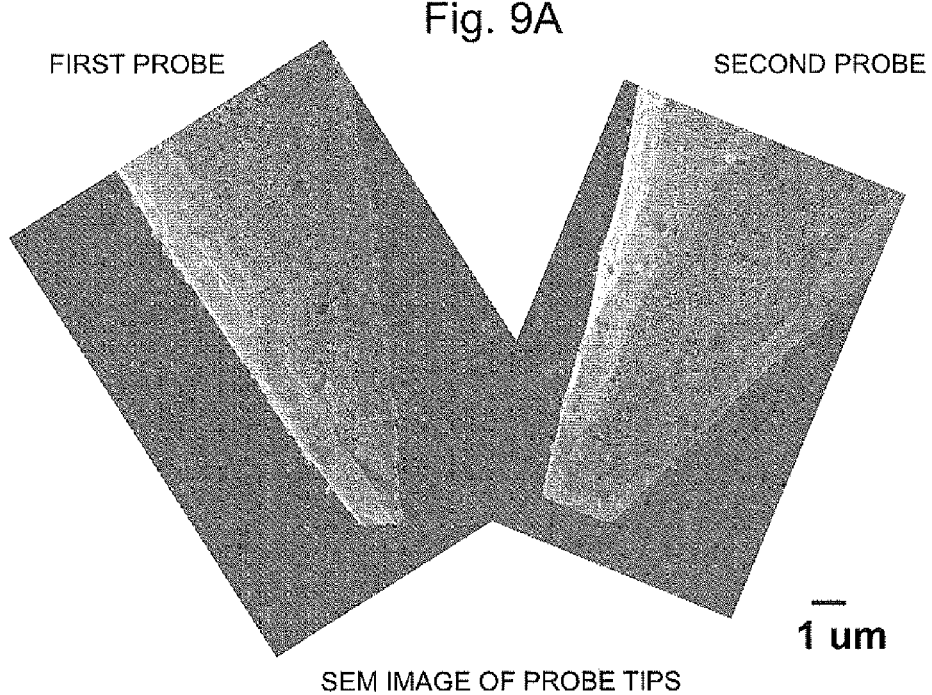
FIGS. 9A and 9B show a validation result when the area near the tip of the second probe was scanned by the first probe.
Figure 9B:
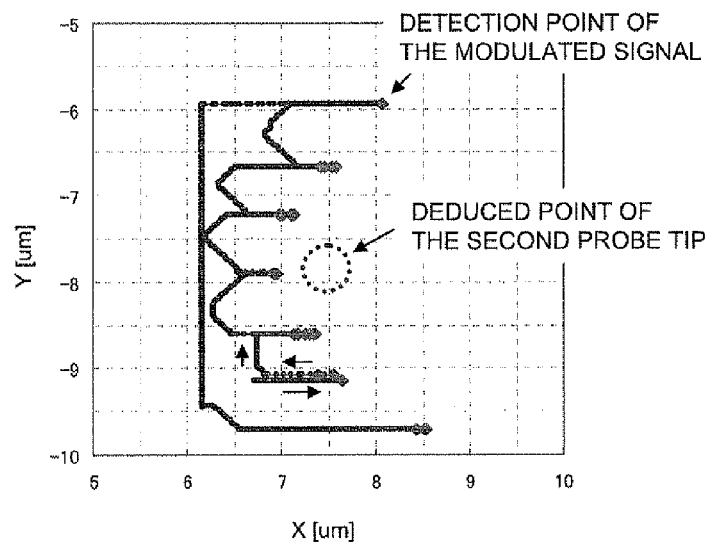
Figure 10A:
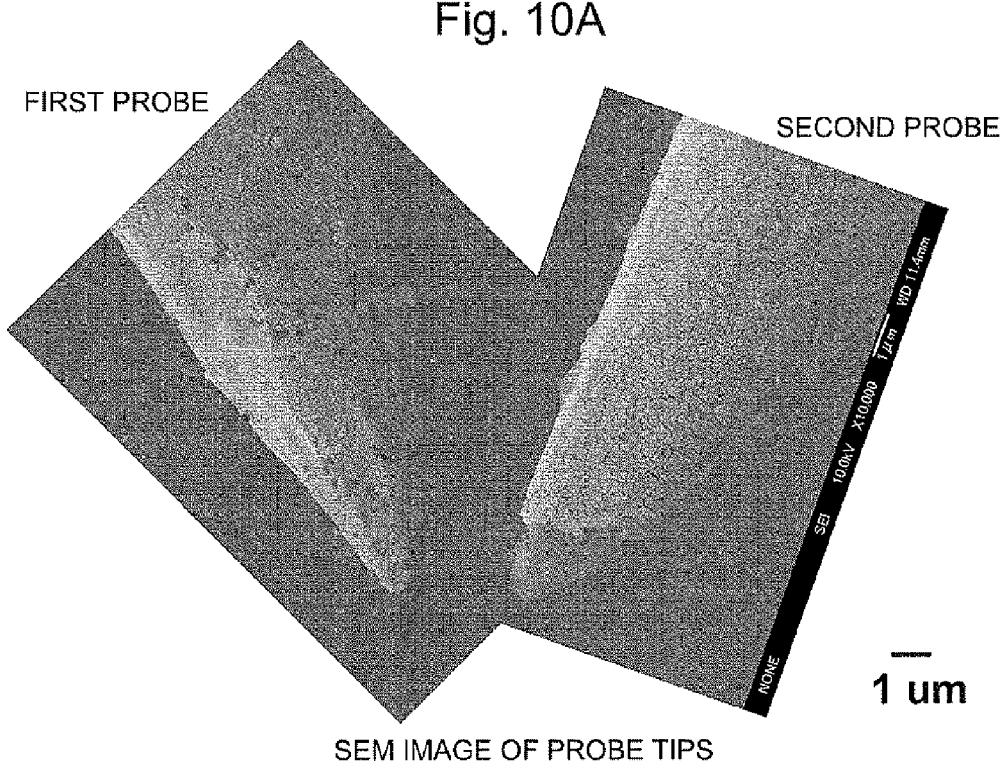
FIGS. 10A and 10B show another validation result respectively corresponding to FIGS. 9A and 9B.
Figure 10B:
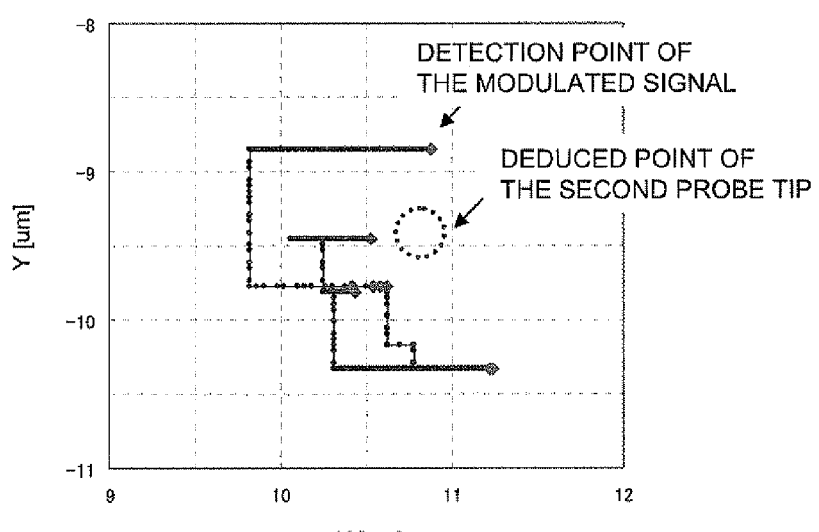
Figure 11A:
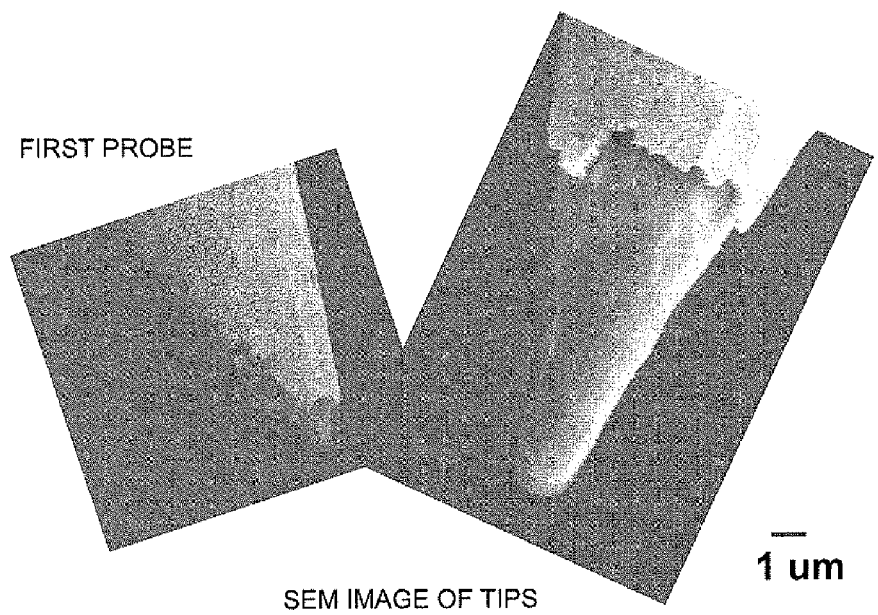
FIGS. 11A and 11B show a validation result when the area near the tip of the second probe was scanned by the first probe.
Figure 11B:
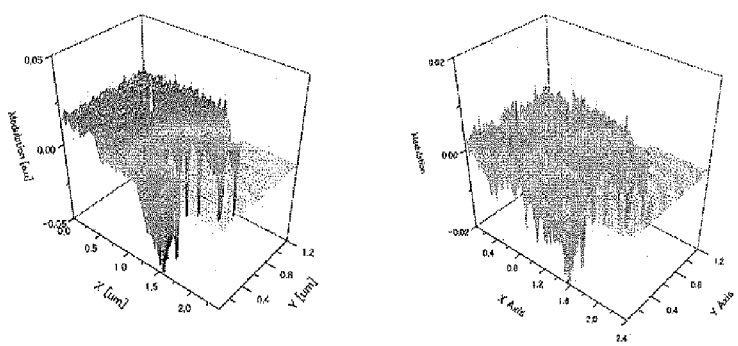

FIGS. 9 through 11 show a concrete result of a scanning, with the first probe 5, of an area near the tip of the second probe 6. FIGS. 9A, 10A, and 11A show the scanning electron microscope (SEM) image of the first probe 5 and the second probe 6 used for the scanning. FIGS. 9B and 10B show the locus of the first probe 5 and the position of the tip of the second probe 6 which was deduced from the locus. FIG. 11B shows the magnitude of the modulated signal of the probes 5 and 6 during the scanning. In FIGS. 9B and 10B, for ease of explanation, the locus of the first probe 5 is drawn with a line. However, actually, the first probe 5 was two-dimensionally moved while vibrating at the period of 100 Hz and the amplitude of 50 nm (peak-to-peak). That is, the first probe 5 was moved in the X-axis direction while quivering in the Y-axis direction.

As shown in FIGS. 9 and 10, from the locus of the first probe 5, the position of the tip of the second probe 6 was deduced as indicated by the dashed circle. The shape of the line connecting the points where the modulated signal was detected in the locus of the first probe 5 was similar to the profile of the tip of the second probe. In the verification experiment shown in FIGS. 9A and 9B, no damage was found at the tip of the first and second probes 5 and 6 after the experiment was finished. This indicates that the area near the second probe 6 was successfully scanned by the first probe 5 without a collision of the probes 5 and 6. In the verification experiment shown in FIGS. 10A and 10B, a gold coating was partially removed from the tip of the first and second probes 5 and 6 after the experiment was finished, although no damage was found in a glass portion. This suggests the possibility that the probes 5 and 6 came into contact with each other during the scanning by the first probe 5.

As is understood from FIG. 11B, when the distance between the probes 5 and 6 is not more than a certain value (i.e. when they are in proximity to each other), the modulated signal of the first probe 5 sharply attenuates. In addition, it has been found that the profile of the tip portion of the second probe 6 can be deduced from the shape of the modulated signal map of the first probe 5. After the experiment, a large detachment of the gold coating was found at the tip portion of the second probe 6 (refer to FIG. 11A). However, the modulated signal map does not show an evidence of a collision of the two probes.

Figure 12A:
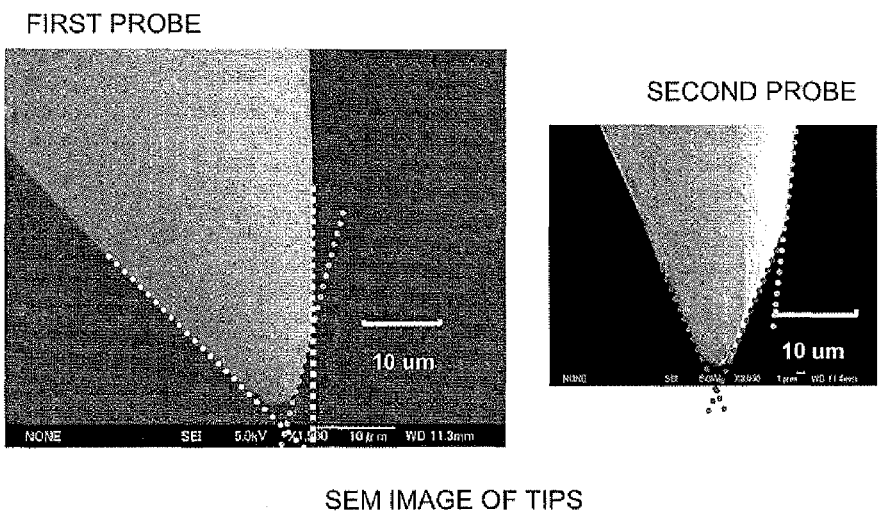
FIGS. 12A and 12B show a validation result when the area near the tip of the second probe was scanned by the first probe.
Figure 12B:
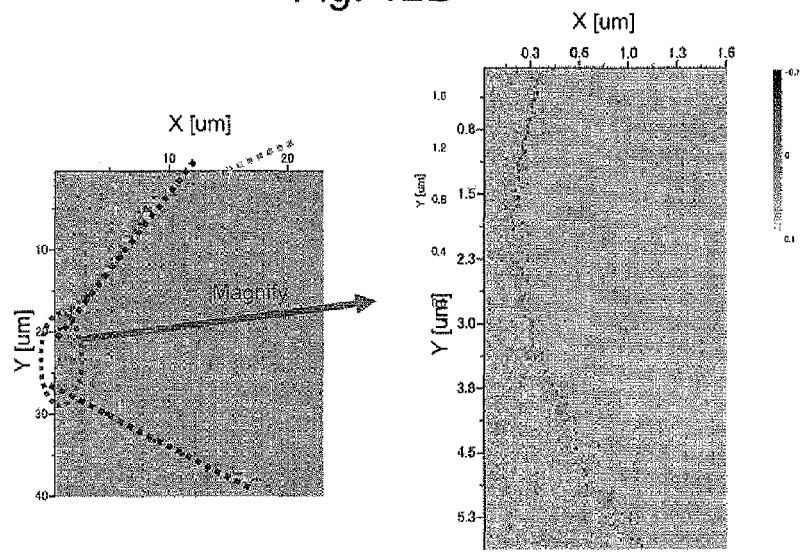

FIG. 12B illustrates a modulated signal map of the first probe 5 when a scanning was broadly performed by using a probe having a characteristic tip shape. In the modulation map, the decrease and increase of the voltage value is expressed by varying the color strength at each point. The darkest shade (black) indicates a 10% decrease with respect to the voltage value of the modulated signal when the two probes are apart from each other, and the lightest shade (gray) indicates a 10% increase.

As shown in FIG. 12A, the tip portion of the two probes has a double-tapered shape, with two gradients extending at different angles. A two-stage gradient is also observed in the modulated map shown in FIG. 12B, which shows that it is possible to deduce the shape of the tip of a probe.

Figure 13A:
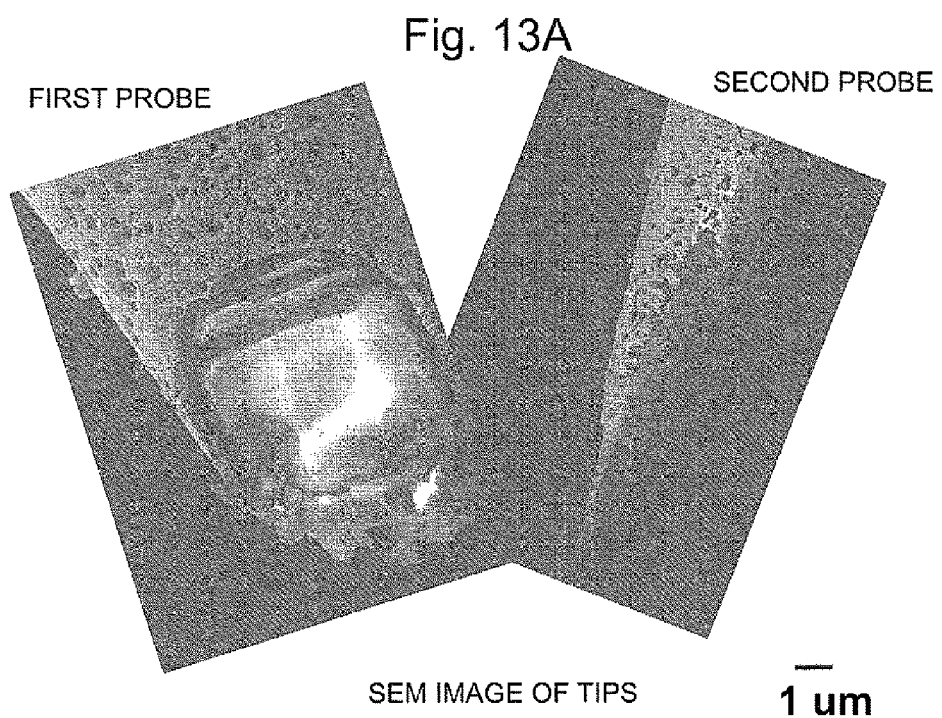
FIGS. 13A and 13B show another validation result respectively corresponding to FIGS. 12A and 12B.
Figure 13B:
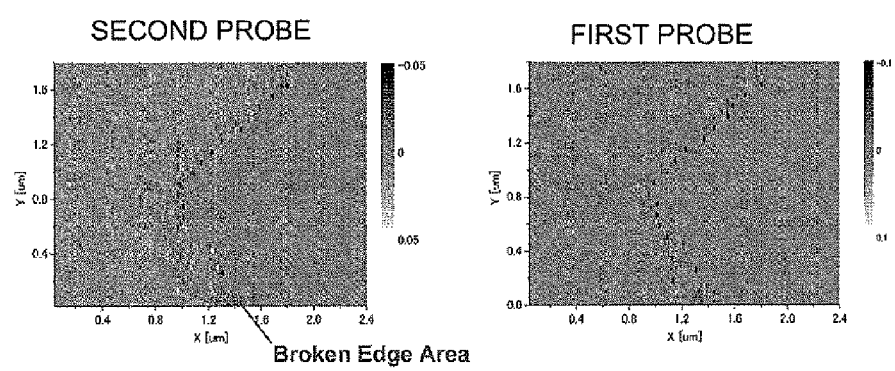

FIGS. 13A and 13B, which correspond to FIGS. 12A and 12B, show the case where the approach was performed by using a first probe with a significantly damaged tip. As shown in FIG. 13B, a special shape of the probe tip due to the damage was observed. In addition, the evidence of a collision (the area surrounded by an ellipse) of the first probe 5 and the second probe 6 was observed in the modulated signal map.

EXAMPLES

Next, the result of an observation of a carrier flow path will be described. The observation was performed for a single quantum well (SQW) sample of InGaN in the dual IC mode by using the aforementioned near-field optical microscope. In this experiment, the first probe 5 was used as the C probe and the second probe 6 as the I probe. The observation was performed while the first probe 5 was moved by the probe movement mechanism 10. The control of the distance between the first and second probes 5 and 6 was performed in the dualband modulation control method which was described earlier.

Figure 14:
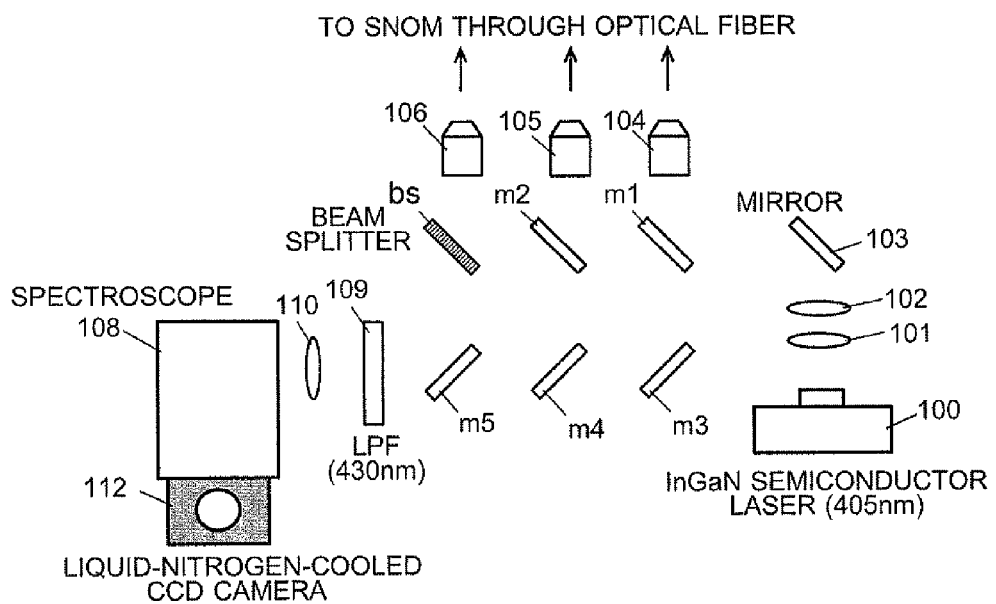
FIG. 14 shows an optical system of the SNOM according to an embodiment of the present invention.

FIG. 14 shows an outline of the optical system of the near-field optical microscope which was used for the observation. The optical system of the present embodiment is designed so that a user can select at will any one of measurement modes among the dual IC mode, IC mode, I mode, and C mode. In the dual IC mode, the arrangement of the I probe and C probe can be changed.

In particular, two lenses 101 and 102, and a mirror 103 are arranged on the emitted light path of an InGaN semiconductor laser 100. Five mirrors m1 through m5 and one beam splitter bs are arranged in a matrix pattern between the mirror 103 and three fiber mounts 104 through 106, as well as between the three fiber mounts 104 through 106 and a spectroscope 108. Each of the fiber mounts 104 through 106 holds an optical fiber having a probe at the end thereof. Each of the mirrors m1 through m5 and the beam splitter bs, which are arranged in a matrix pattern, can be moved to a position outside the optical path. A long path filter (LPF, 430 nm) 109 and a lens 110 are arranged between the spectroscope 108 and the mirror m5. The LPF 109 is used for cutting the excitation light of 405 nm emitted from the semiconductor laser 100. The light entering the spectroscope 108 through the LPF 109 and the lens 110 is detected by a liquid-nitrogen-cooled CCD 112.

Figure 15:
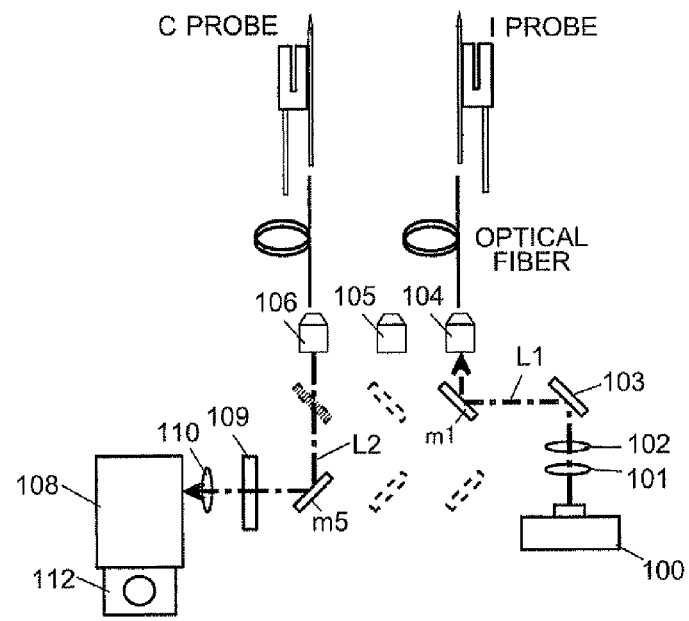
FIG. 15 shows an example of the optical system of the SNOM for performing a measurement in a dual IC mode.

FIG. 15 shows the optical system in the dual IC mode in which a C probe and an I probe are respectively attached to the fiber mount 106 and the fiber mount 104, which are located at both ends. As shown in FIG. 15, in this case, three mirrors other than the mirror m1 immediately after the mirror 103 and the mirror m5 immediately before the LPF 109, and the beam splitter are located outside the optical path. Consequently, the laser light from the semiconductor laser 100 is introduced to the I probe by the mirror m1 as indicated with an alternate long and short dash line L1. The laser light introduced to the I probe is ejected from the opening at the probe tip to excite the SQW. Meanwhile, the luminescence collected by the C probe is introduced to the LPF 109 by the mirror m5 as indicated with an alternate long and short dash line L2, passes through the spectroscope 108, and is detected by the CCD 112.

Figure 16:
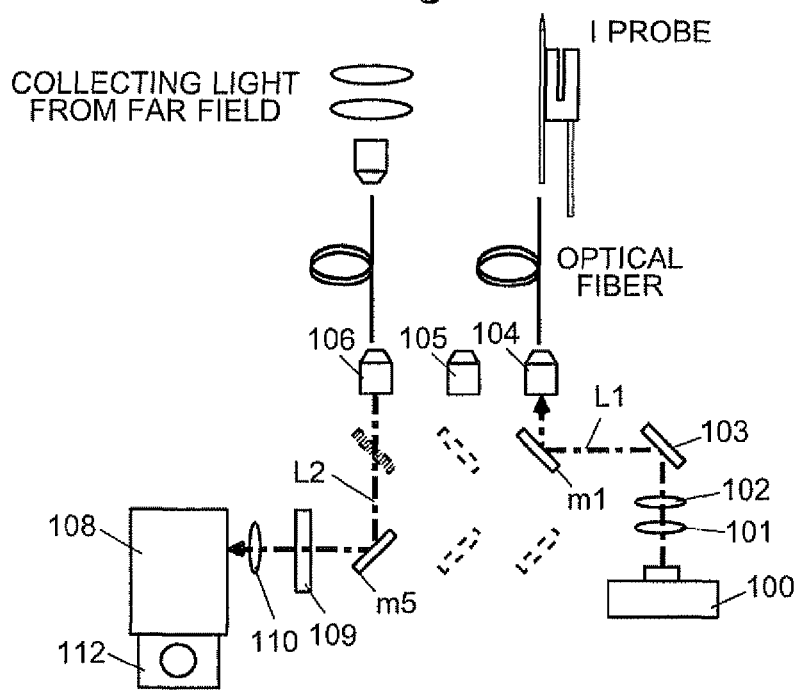
FIG. 16 shows an example of the optical system of the SNOM for performing a measurement in an I mode.
Figure 17:
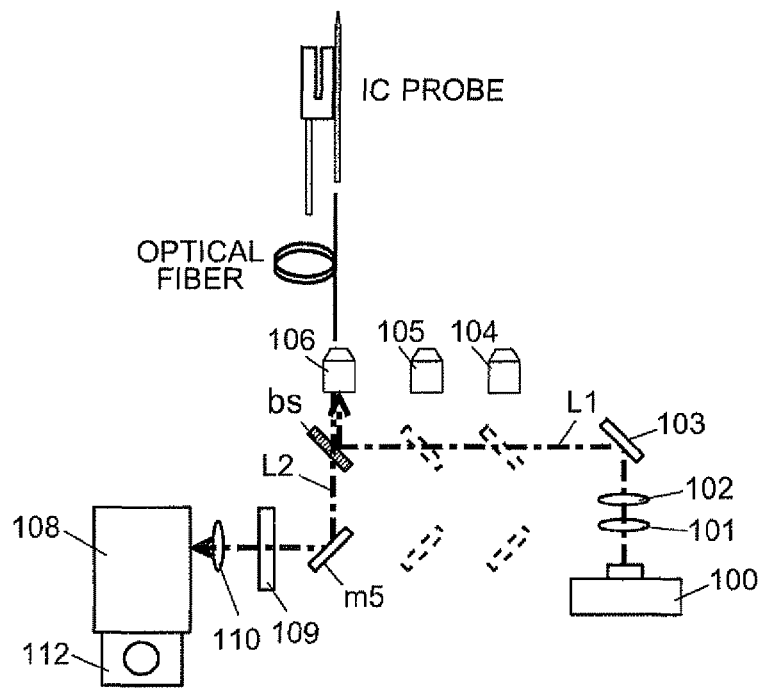
FIG. 17 shows an example of the optical system of the SNOM for performing a measurement in an IC mode.

FIGS. 16 and 17 respectively show an example of the optical system of the I mode and IC mode in which one probe is used.

Figure 18:
FIG. 18 shows a picture of the I probe, C probe, and a sample under measurement.

FIG. 18 is a picture showing how the sample was measured with the I probe and C probe. At the moment shown in FIG.

18, an approach of the C probe has not yet been performed but an excitation light (laser light) is being emitted from the I probe on the right.

Figure 19A:
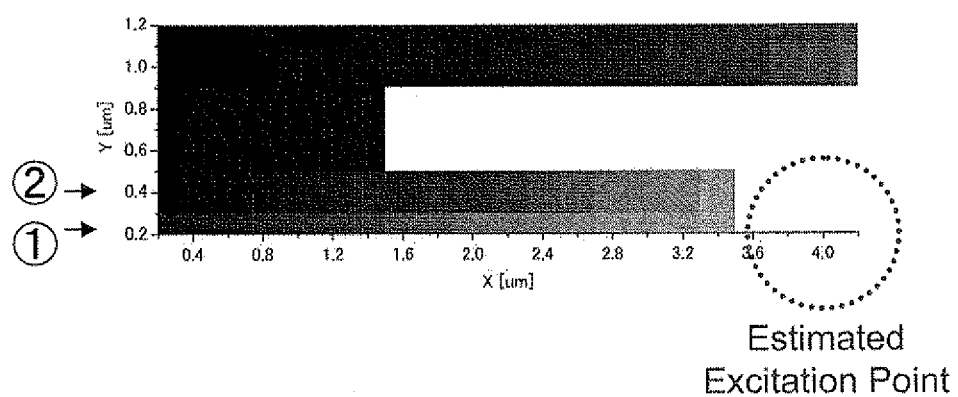
FIG. 19A shows a luminescence intensity map of a recombination luminescence when carriers of a single quantum well (SQW) were excited.
Figure 19B:
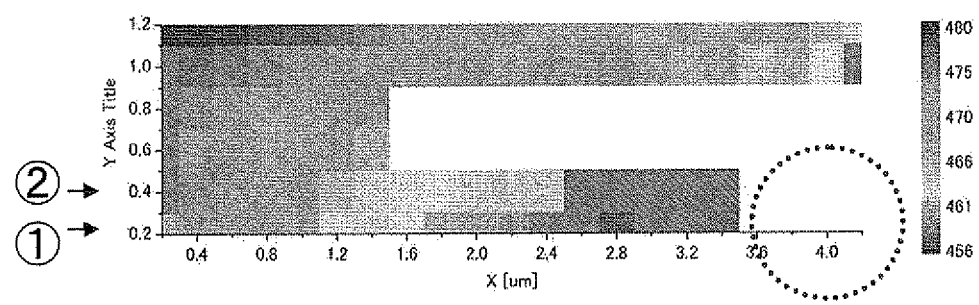
FIG. 19B shows a luminescence peak wavelength map of a recombination luminescence when carriers of a single quantum well (SQW) were excited.

FIGS. 19A and 19B show an observation result. FIG. 19A shows a luminescence intensity map and FIG. 19B shows a luminescence peak wavelength map. In this example, the C probe was made to approach the I probe, and when the voltage value of the modulated signal from the C probe was decreased to 85%, the approach was halted and the C probe was returned. Then, after being slightly moved in the Y-direction, the C probe was made to approach the I probe again. The central data of FIGS. 19A and 19B are missing. This is because the C probe was returned due to an erroneous detection of an attenuation of the modulated signal caused by a noise.

Figure 20:
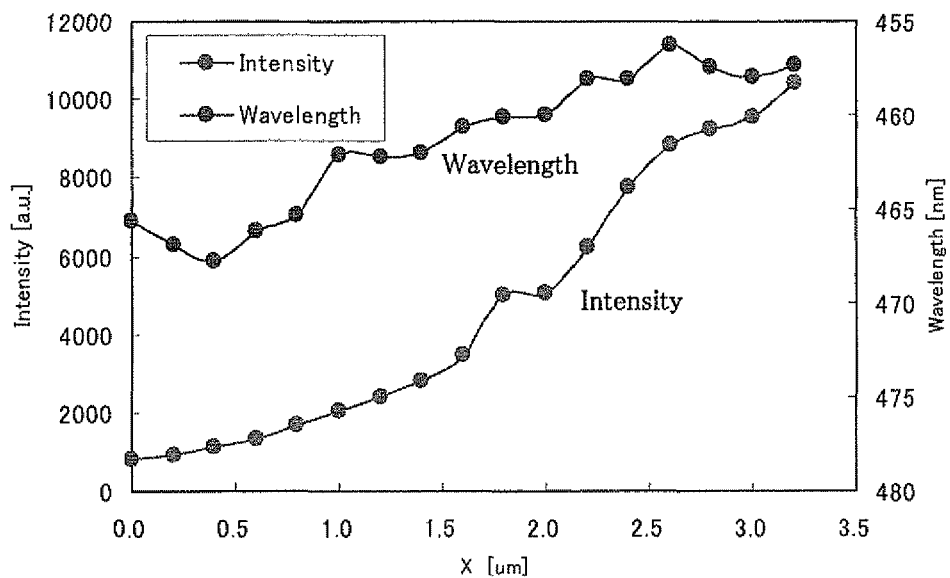
FIG. 20 is a graph showing the profile of the line 1 in FIGS. 19A and 19B.
Figure 21:
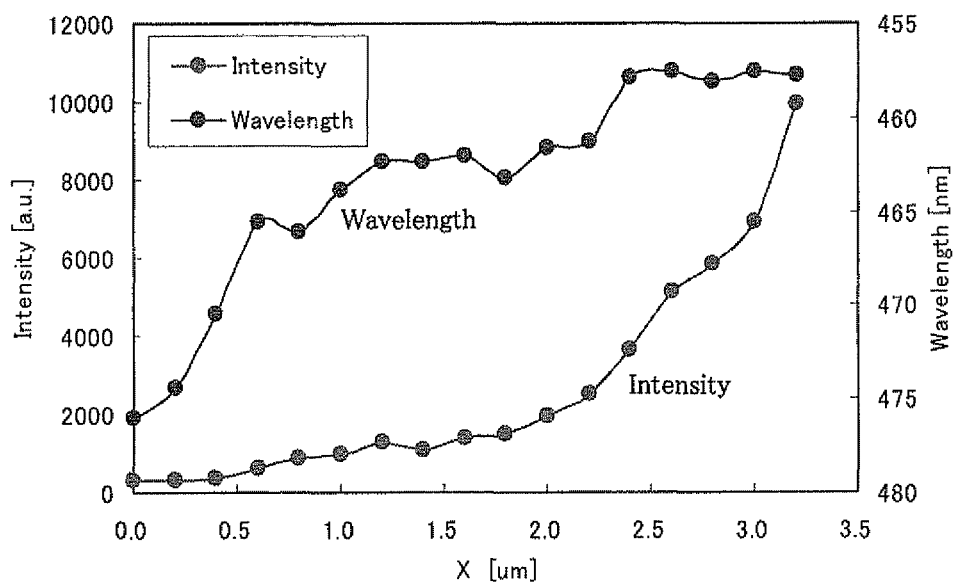
FIG. 21 is a graph showing the profile of the line 2 in FIGS. 19A and 19B.
Figure 22:
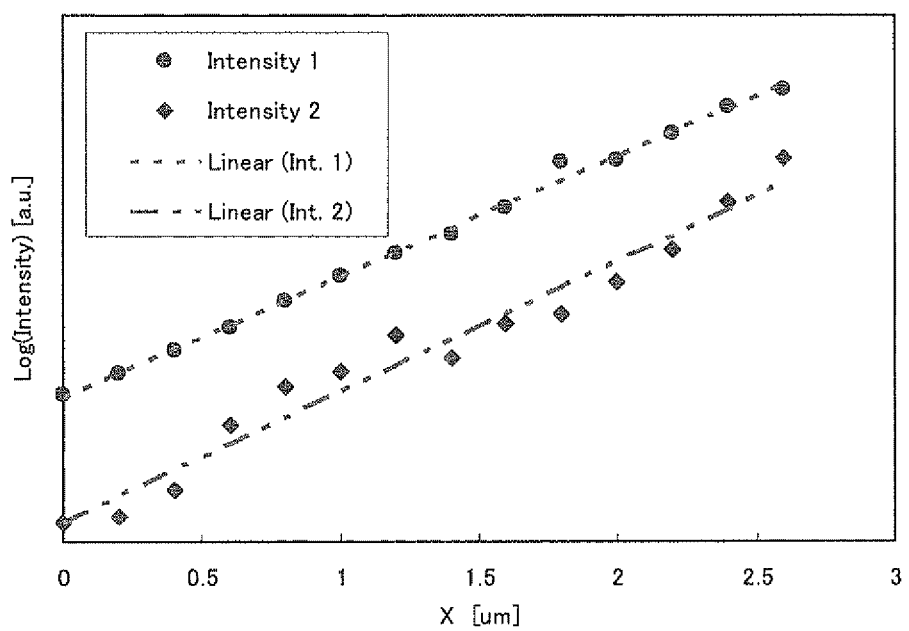
FIG. 22 is a graph in which the vertical axis of the luminescence intensity of each of FIGS. 20 and 21 is converted into the logarithmic scale.

FIGS. 20 and 21 show the profile of the lines indicated with the circled numbers in FIGS. 19A and 19B, respectively. FIG. 20 corresponds to the circled number "1" in FIG. 19, and FIG. 21 to the circled number "2" in FIG. 19. FIG. 22 shows a graph in which the vertical axis of the luminescence intensity of FIGS. 20 and 21 was converted into the logarithmic scale.

FIGS. 19 through 21 show that the luminescence decreases as the distance from the excitation point becomes larger. This suggests that it is possible to obtain the progressive distribution of carriers by using the C probe. In particular, the fact that the luminescence is high in the area within approximately 1 μm from the excitation point suggests that the diffusion of the carriers from the excitation point have possibly extended into this area.

Next, the second embodiment of the present invention will be described with reference to FIGS. 23 through 30. The same components as in the first embodiment are indicated with the same numerals and the explanations of these components are omitted. The explanation will be made for the points which are different from the first embodiment.

The second embodiment is significantly different from the first embodiment in the following three points:

(1) the amplitude direction of the specific frequency and the arrangement of the crystal oscillators;

(2) the processing flow of the dualband modulation control method; and (3) the method of probe scan.

In addition to the above, the present embodiment is different from the first embodiment in that the probes were coated with aluminum (Al), which is harder than gold (Au). However, the explanation for this regard is omitted and the aforementioned points (1) through (3) will be described one by one.

(1) Amplitude Direction of the Specific Frequency and the Arrangement of the Crystal Oscillators FIG. 23A shows how the first and second probes 5 and 6 vibrate in the first embodiment. In the first embodiment, as indicated with the arrows in FIG. 23A, each amplitude direction of the specific frequency of the first and second probes 5 and 6 is set to be the direction of tapping the sample surface. The crystal oscillators 25 and 27 are attached to the opposite sides from the facing sides of the probes 5 and 6.

FIGS. 23B and 23C show how the first and second probes 5 and 6 vibrate in the second embodiment. In the second embodiment, as indicated with the arrows in FIGS. 23B and 23C, the amplitude direction of the specific frequency of the first and second probes 5 and 6 was set to be almost parallel to the sample surface. The crystal oscillators 25 and 27 were attached to the positions rotated from the attachment positions in the first embodiment by 90 degrees around the probes 5 and 6. That is, the crystal oscillators 25 and 27 were attached laterally to the probes 5 and 6.

In the present embodiment, such a design change can remove the mode in which the probes 5 and 6 tap the sample, preventing the tips of the probes 5 and 6 from touching the sample and being damaged.

(2) Processing Flow of the Dualband Modulation Control Method

Figure 24:
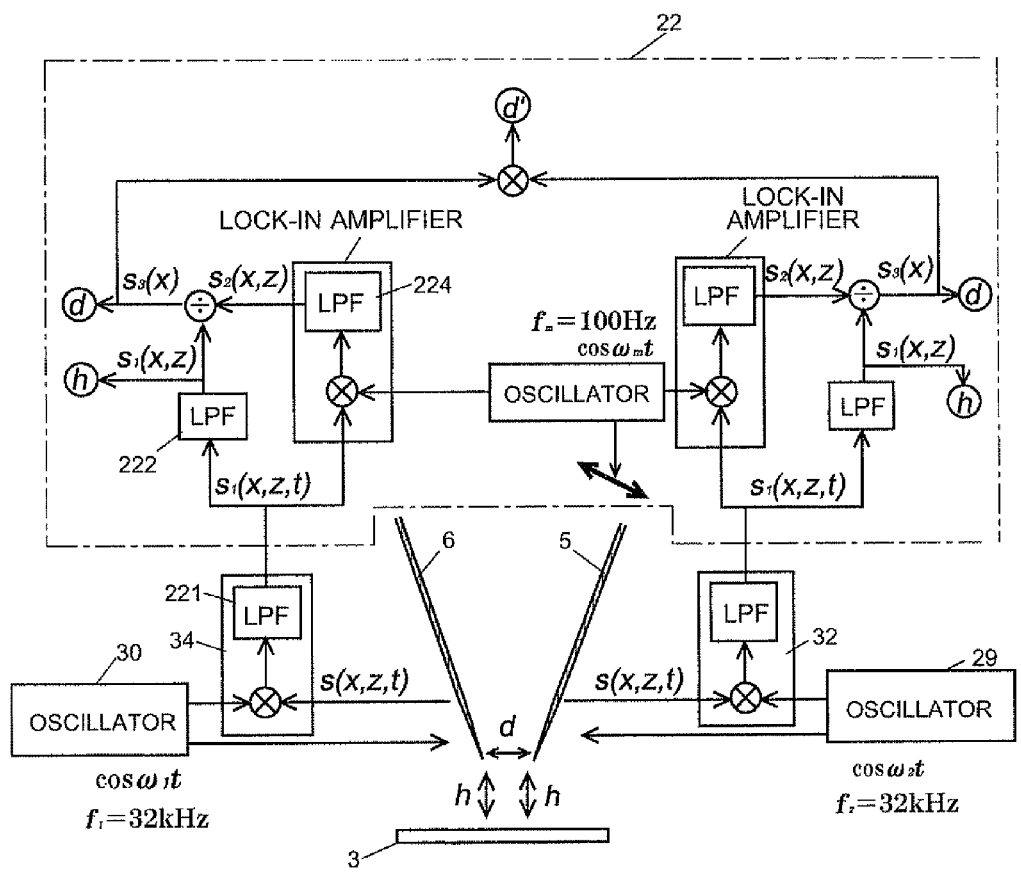
FIG. 24 is a diagram corresponding to FIG. 4.

FIG. 24 is a diagram showing the processing flow of the dualband modulation control method in the second embodiment. In the second embodiment, the control unit 22 detects the proximity of the probes 5 and 6 to each other based on the product d' of the information $s_3(x)$ on the distance d between the first probe 5 and the second probe 6 obtained from the piezoelectric signal $S(x, z, t)$ of the crystal oscillator 25 attached to the first probe 5 and the information $s_3(x)$ on the distance d between the second probe 6 and the first probe 5 obtained from the signal $S(x, z, t)$ of the crystal oscillator 27 attached to the second probe 6. In FIG. 24, the oscillator oscillates at the specific frequency (100 Hz). However, actually, it is the control unit 22 that has the function of oscillation at the specific frequency, as in the first embodiment.

In the present embodiment, tuning-fork crystal oscillators 25 and 27 having a resonant frequency around 32 kHz (32.7 kHz) are respectively attached to the first and second probes 5 and 6. The frequency (specific frequency) of the physical vibration provided to the first probe 5 was 100 Hz.

Figure 25A:
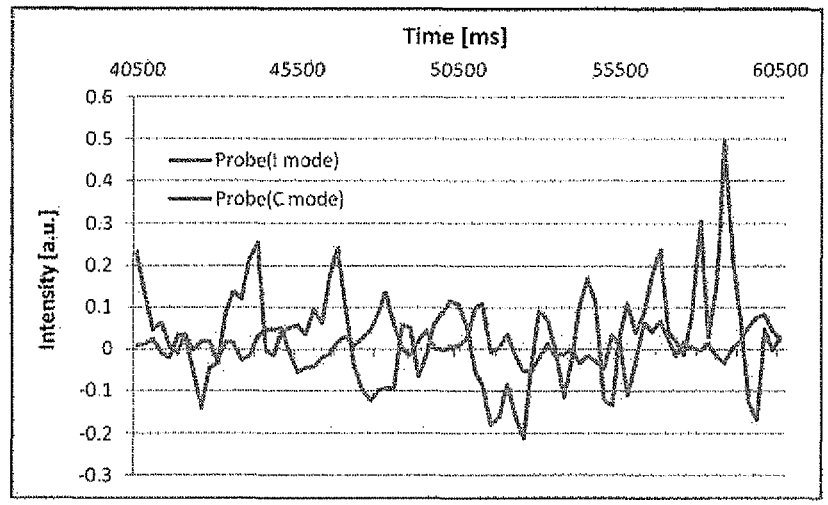
FIGS. 25A and 25B show a measurement result of the signal regarding the distance between the probes when these probes were in proximity to each other.
Figure 25B:
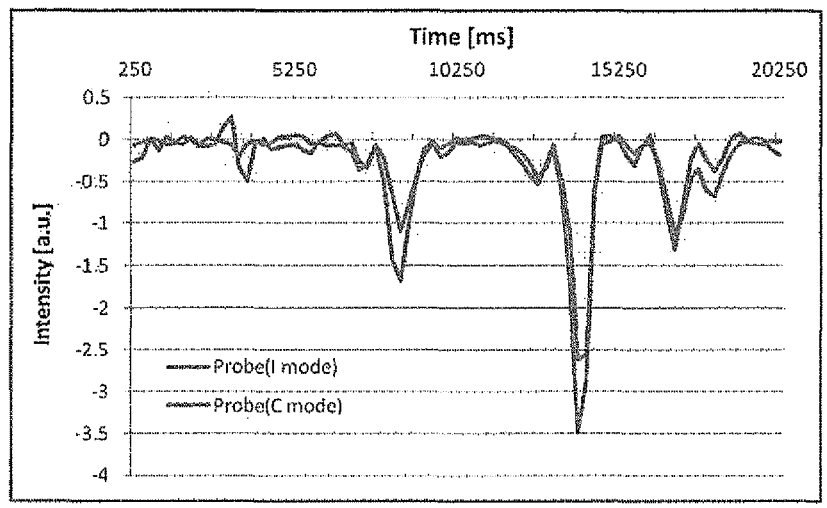

FIGS. 25A and 25B show a measurement result of the signal $s_3(x)$ of each of the probes 5 and 6, in which one of the first and second probes 5 and 6 was gradually moved to the other probe, with the amplitude of the modulated vibration of the specific frequency (100 Hz) being set at 25 nm, the peak-to-peak value at 50 nm, the scan step interval at 25 nm, and the voltage applied to the crystal oscillators 25 and 27 at 50 mV. FIG. 25A shows the result of a (far field) measurement in which the probes 5 and 6 were distant from each other, and FIG. 25B shows the result of a (near field) measurement in which the probes 5 and 6 were in proximity to each other. The vertical axis of FIGS. 25A and 25B represents the signal intensity, and the horizontal axis represents the time (millisecond). As shown in FIGS. 25A and 25B, the signal $s_3(x)$ of the probes 5 and 6 fluctuates in both cases where the two probes 5 and 6 were distant from and in proximity to each other. The changes of the signals $s_3(x)$ of the probes 5 and 6 are synchronized with each other when the probes 5 and 6 were in proximity to each other. In the near field (FIG. 25B), several peaks of attenuation of the signals $s_3(x)$ are observed. This is due to the repetitive movement of the probes 5 and 6 in which the probes 5 and 6 were moved into proximity to each other, causing an attenuation of the signals $s_3(x)$, in response to which the probes 5 and 6 were temporarily separated and then moved closer to each other again.

FIGS. 25A and 25B show that the modulated signals $s_3(x)$ of the probes 5 and 6 change not only when the probes 5 and 6 are in proximity to each other, but also when the probes 5 and 6 are in proximity to the sample. Therefore, in detecting the proximity of the probes 5 and 6 based on the fact that the signal of one probe exceeds a threshold, it is necessary to set a large value as the threshold in view of the pulse noise.

On the other hand, the use of the product of the signals of $s_3(x)$ of the probes 5 and 6 as in the present embodiment enables a signal detection by a kind of synchronous detection method, which improves the S/N ratio. This allows the threshold to be set at a low value so as to enhance the detection sensitivity.

Additionally, the use of the product of the signals of $s_3(x)$ of the probes 5 and 6 can prevent an erroneous determination that a change of the signal due to a pulse noise generated in one probe is mistaken for a change due to a proximity of the probes 5 and 6. In particular, since the change of the signals $s_3(x)$ are synchronized while the probes 5 and 6 are in proximity to each other, the use of the product of the signals of $s_3(x)$ of the probes 5 and 6 can eliminate an erroneous determination as much as possible while the probes 5 and 6 are distant from each other, allowing an accurate detection of the proximity of the probes 5 and 6.

Figure 26:
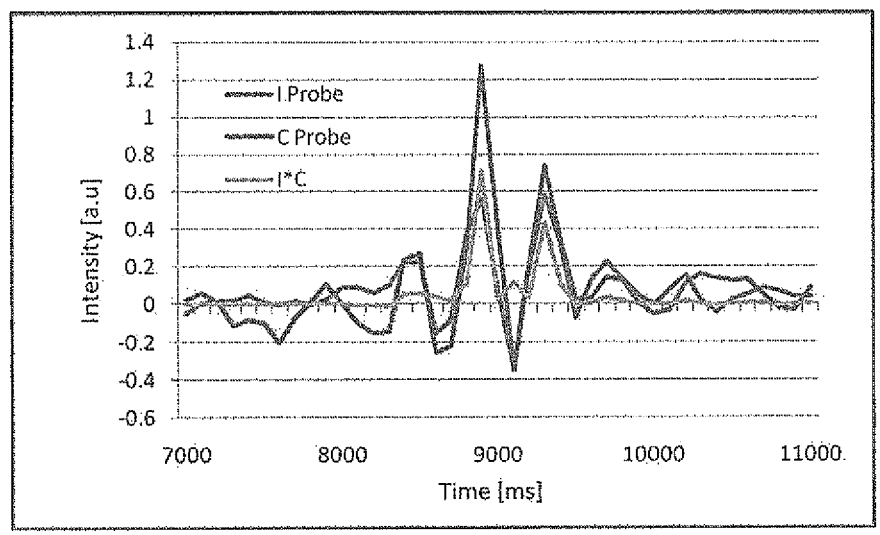
FIG. 26 shows the change of the signals $S_3(x)$ of the first and second probes and that of the product of these signals when the area near the tip of the second probe was scanned with the first probe.

FIG. 26 shows a change of the signals $s_3(x)$ of the probes 5 and 6 as well as the product of these signals while an area around the tip of the second probe 6 was scanned with the first probe 5. FIG. 26 shows that the signals of the probes 5 and 6 significantly fluctuate when the product of the signals $s_3(x)$ is large. That is, the change of the voltage signal of the specific frequency of the probes 5 and 6 is due to the proximity of the probes 5 and 6. A plurality of peaks are observed in FIG. 26. This is probably because the signal attenuated not only when the tip of the first probe 5 was in proximity to the tip of the second probe 6, but also when the tip of the first probe 5 was in proximity to the side of the second probe 6.

(3) Method of Probe Scan

Figure 27:
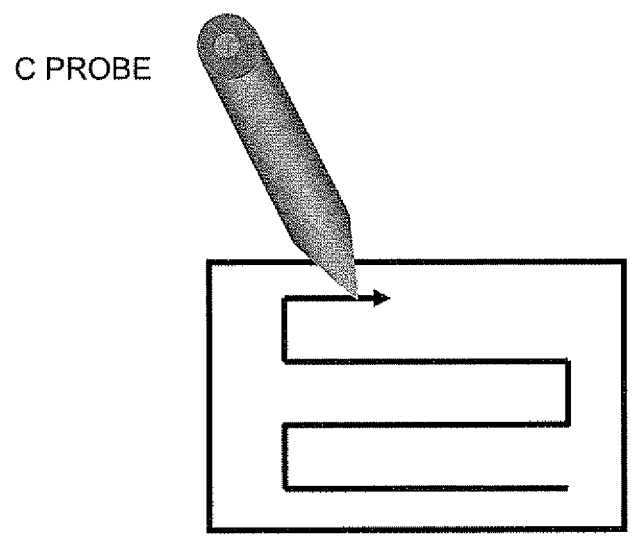
FIG. 27 is an explanation diagram of a reciprocating scanning method.

FIG. 27 shows the scanning method used in the first embodiment. As shown in FIG. 27, in the first embodiment, when the C-mode probe (C probe) used for scanning is detected in proximity to the I-mode probe (I probe), the C probe is forced to move to the next line. Then, after performing a backward scan in the direction away from the I probe, the C probe is once more moved toward the I probe. In this manner, a reciprocating scanning is performed.

However, when the C probe is forced to move to the next line, the C probe and I probe might collide with each other due to this forced movement. In addition, when the C probe and I probe move closer to each other, not only the signal of the specific frequency (100 Hz), but also the signal of the resonant frequency (32 kHz) attenuates. Consequently, the control unit 22 erroneously determines that the C probe is moved to the sample, and moves the C probe to the direction away from the sample. As a result, in the reciprocating scanning method, the C probe moves away from the sample when the C probes performs a reciprocating scanning in the area where the C probe and the I probe are closest to each other.

Figure 28:
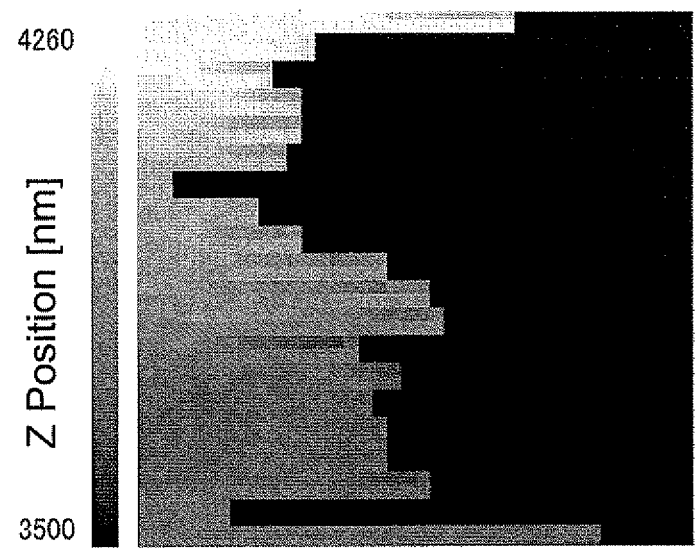
FIG. 28 is a sample surface image (topographic image) in a reciprocating scanning.

FIG. 28 shows a surface image (topographic image) of a sample in a reciprocating scanning. In this experiment, a sample with an approximately flat surface was used. In FIG. 28, the left portion is the scanning area of the C probe, and the border portion to the intense black area in the right portion is the area where the C probe and the I probe are closest to each other. As shown in FIG. 28, in the area where the C probe and the I probe are most close to each other, the color strengths of adjacent scanning lines are different. This shows that the distance between the C probe and the sample differs depending on whether the probe scanning is performed leftward or rightward.

Figure 29:
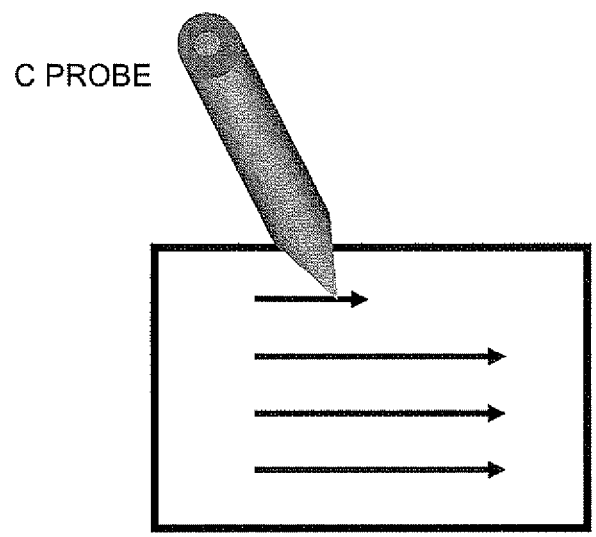
FIG. 29 is an explanation diagram of a one-way scanning method.
Figure 30:
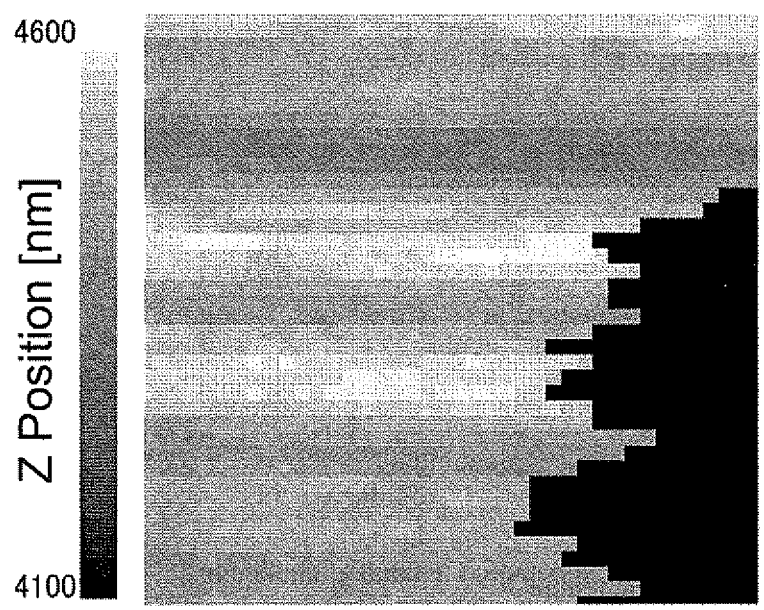
FIG. 30 is a sample surface image (topographic image) in a one-way scanning.

Given this factor, in the second embodiment, a one-way scanning method as shown in FIG. 29 was used. FIG. 30 shows a sample surface image in the one-way scanning method. This method can avoid the collision of the probes 5 and 6 in performing a scanning in the area where the probes 5 and 6 are closest to each other. A comparison with FIG. 28 shows that, in the one-way scanning method, the difference in the color strength of the adjacent lines is small even in the area where the probes 5 and 6 are closest to each other, and the shade does not change within a line. This indicates that the C probe can be moved while maintaining a constant distance to the sample.

The present invention is not limited to the aforementioned embodiments, and a variety of changes are possible.

For example, the scanning probe microscope may be any type of microscope other than a scanning near-field optical microscope, such as a scanning tunnel microscope, an atomic force microscope, a magnetic force microscope, or a friction force microscope.

The number of the first and second probes is not limited to one. The number of both the first and second probes may be more than one. Or, the number of one probe may be one and that of the other probe may be more than one.

In the embodiments, the second probe was moved relative to the sample surface by moving the sample stage. However, the second probe may be directly moved to scan the sample surface. Such a directly moved probe may be either one of the first and second probes, or both the probes.

The vibration of the specific frequency may be provided to either the first probe or second probe. Alternatively, the vibration of the specific frequency may be provided to both probes.

The specific frequency is not limited to 100 Hz; it can be set at any value.

In the second embodiment, the proximity of the first and second probes was detected based on the product of the signals $s_3(x)$ regarding the distance between the first and second probes. However, the proximity of the probes can be detected based on the sum of the signals $s_3(x)$.

EXPLANATION OF NUMERALS

| | |
|---|---|
| 1 | Scanning Near-Field Optical Microscope |
| 3 | Sample Stage |
| 5 | First Probe |
| 6 | Second probe |
| 8 | Sample Movement Mechanism |
| 10 | Probe Movement Mechanism |
| 12 | Distance Control Mechanism (Probe-Sample Distance Controller) |
| 14 | Light Source |
| 16 | Detection Unit |
| 22 | Control Unit (Controller, Vibrator, Probe Proximity Detector, and Vibration Monitor) |
| 25, 27 | Crystal Oscillator |
| 29, 30 | Vibration Oscillator |
| 32, 34 | Lock-In Amplifier (Vibration Monitor) |

The invention claimed is:

1. A scanning probe microscope having a first probe and a second probe both for scanning a sample while maintaining a constant distance to a surface of the sample, comprising:
   a) a first scanner for moving the first probe relative to the sample;
   b) a second scanner for moving the second probe relative to the sample;
   c) a vibrator for providing either the first probe or the second probe with a vibration of a specific frequency;
   d) a vibration monitor for monitoring the vibration of the specific frequency of the first probe and the second probe;
   e) a probe proximity detector for detecting proximity of the first probe and the second probe to each other based on a change of at least either a vibration of the first probe or a vibration of the second probe; and
   f) a controller for controlling the first scanner and the second scanner based on a result of detection by the probe proximity detector.

2. The scanning probe microscope according to claim 1, wherein:
   the vibrator provides the first probe with the vibration; and
   the probe proximity detector detects proximity of the first probe and the second probe to each other based on a fact that a rate of change of the vibration of the first probe is equal to or less than a threshold.

3. The scanning probe microscope according to claim 1, wherein:
the vibrator provides the first probe with the vibration; and
the probe proximity detector detects proximity of the first probe and the second probe to each other based on a fact that a rate of change of the vibration of the second probe exceeds a threshold.

4. The scanning probe microscope according to claim 3, wherein the first probe and the second probe are attached to a first tuning-fork oscillator and a second tuning-fork oscillator, and the scanners move the first probe and the second probe while resonating the tuning-fork oscillators, and the scanning probe microscope comprising:
a voltage detector for detecting a voltage signal induced in each of the tuning-fork oscillators when a tip of the first probe and a tip of the second probe are individually approximated to the surface of the sample; and
a probe-sample distance controller for stabilizing a distance between the tip of each probe and the sample surface based on a result of detection by the voltage detector.

5. The scanning probe microscope according to claim 1, wherein the first probe and the second probe are attached to a first tuning-fork oscillator and a second tuning-fork oscillator, and the scanners move the first probe and the second probe while resonating the tuning-fork oscillators, and the scanning probe microscope comprising:
a voltage detector for detecting a voltage signal induced in each of the tuning-fork oscillators when a tip of the first probe and a tip of the second probe are individually approximated to the surface of the sample; and
a probe-sample distance controller for stabilizing a distance between the tip of each probe and the sample surface based on a result of detection by the voltage detector.

6. The scanning probe microscope according to claim 2, wherein:
the vibrator provides the first probe with the vibration; and
the probe proximity detector detects proximity of the first probe and the second probe to each other based on a fact that a rate of change of the vibration of the second probe exceeds a threshold.

7. The scanning probe microscope according to claim 2, wherein the first probe and the second probe are attached to a first tuning-fork oscillator and a second tuning-fork oscillator, and the scanners move the first probe and the second probe while resonating the tuning-fork oscillators, and the scanning probe microscope comprising:
a voltage detector for detecting a voltage signal induced in each of the tuning-fork oscillators when a tip of the first probe and a tip of the second probe are individually approximated to the surface of the sample; and
a probe-sample distance controller for stabilizing a distance between the tip of each probe and the sample surface based on a result of detection by the voltage detector.

8. A scanning probe microscope having a first probe and a second probe both for scanning a sample while maintaining a constant distance to a surface of the sample, comprising:
a) a first tuning-fork oscillator to which the first probe is attached;
b) a second tuning-fork oscillator to which the second probe is attached;
c) a scanner for moving each of the first probe and the second probe relative to the sample while resonating each of the first tuning-fork oscillator and the second tuning-fork oscillator;
d) a vibrator for providing either the first probe or the second probe with a vibration of a specific frequency;
e) a signal detector for detecting a voltage signal of the specific frequency induced in each of the tuning-fork oscillators when the first probe and the second probe are approximated to each other while the first tuning-fork oscillator and the second tuning-fork oscillator are resonated; and
f) a probe proximity detector for detecting proximity of the first probe and the second probe to each other based on a voltage signal of the specific frequency induced in each of the first tuning-fork oscillator and the second tuning-fork oscillator.

9. The scanning probe microscope according to claim 8, wherein:
the probe proximity detector detects proximity of the first probe and the second probe to each other based on a product of a voltage signal of the specific frequency induced in the first tuning-fork oscillator and a voltage signal of the specific frequency induced in the second tuning-fork oscillator.

10. The scanning probe microscope according to claim 9, wherein:
the specific frequency is different from a resonance frequency of the tuning-fork oscillators.

11. The scanning probe microscope according to claim 8, wherein:
the probe proximity detector detects proximity of the first probe and the second probe to each other based on a sum of a voltage signal of the specific frequency induced in the first tuning-fork oscillator and a voltage signal of the specific frequency induced in the second tuning-fork oscillator.

12. The scanning probe microscope according to claim 11, wherein:
the specific frequency is different from a resonance frequency of the tuning-fork oscillators.

13. The scanning probe microscope according to claim 8, wherein:
the specific frequency is different from a resonance frequency of the tuning-fork oscillators.

14. A method for detecting proximity of probes of a scanning probe microscope having a first probe and a second probe both for scanning a sample while maintaining a constant distance to a surface of the sample, comprising the steps of:
providing either the first probe or the second probe with a vibration of a specific frequency;
monitoring the vibration of the specific frequency of the first probe and the second probe; and
detecting proximity of the first probe and the second probe to each other based on a change of at least either a vibration of the specific frequency of the first probe or a vibration of the specific frequency of the second probe.

15. The method for detecting proximity of probes of a scanning probe microscope according to claim 14, wherein:
the vibration of the specific frequency is provided to the first probe; and
proximity of the first probe and the second probe to each other is detected based on a fact that a rate of change of the vibration of the first probe is equal to or less than a threshold.

16. The method for detecting proximity of probes of a scanning probe microscope according to claim 15, wherein:
the vibration of the specific frequency is provided to the first probe; and
proximity of the first probe and the second probe to each other is detected based on a fact that a rate of change of the vibration of the second probe exceeds a threshold.

17. The method for detecting proximity of probes of a scanning probe microscope according to claim 14, wherein:
the vibration of the specific frequency is provided to the first probe; and
proximity of the first probe and the second probe to each other is detected based on a fact that a rate of change of the vibration of the second probe exceeds a threshold.

18. A method for detecting proximity of probes of a scanning probe microscope having a first probe and a second probe both for scanning a sample while maintaining a constant distance to a surface of the sample, wherein:
the first probe is attached to a first tuning-fork oscillator;
the second probe is attached to a second tuning-fork oscillator;
a vibration of a specific frequency is provided to either the first probe or the second probe; and
proximity of the first probe and the second probe to each other is detected based on a voltage signal of the specific frequency induced in each of the first tuning-fork oscillator and the second tuning-fork oscillator.

19. The method for detecting proximity of probes of a scanning probe microscope according to claim 18, wherein:
proximity of the first probe and the second probe to each other is detected based on a product of a voltage signal of the specific frequency induced in the first tuning-fork oscillator and a voltage signal of the specific frequency induced in the second tuning-fork oscillator.

20. The method for detecting proximity of probes of a scanning probe microscope according to claim 18, wherein:
proximity of the first probe and the second probe to each other is detected based on a sum of a voltage signal of the specific frequency induced in the first tuning-fork oscillator and a voltage signal of the specific frequency induced in the second tuning-fork oscillator.

* * * * *